(12) United States Patent
Anburose et al.

(10) Patent No.: US 10,148,506 B1
(45) Date of Patent: Dec. 4, 2018

(54) NETWORK CONFIGURATION SERVICE DISCOVERY

(71) Applicant: Juniper Networks, Inc., Sunnyvale, CA (US)

(72) Inventors: Nirmal Anburose, Bangalore (IN); Chandrasekhar A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 15/195,960

(22) Filed: Jun. 28, 2016

(51) Int. Cl.
| | |
|---|---|
| *G06F 15/16* | (2006.01) |
| *H04L 12/24* | (2006.01) |
| *H04L 29/08* | (2006.01) |
| *H04L 12/46* | (2006.01) |
| *G06F 17/30* | (2006.01) |

(52) U.S. Cl.
CPC .... *H04L 41/0853* (2013.01); *G06F 17/30312* (2013.01); *H04L 12/4641* (2013.01); *H04L 41/0213* (2013.01); *H04L 41/12* (2013.01); *H04L 67/20* (2013.01)

(58) Field of Classification Search
USPC ....... 709/223, 217, 201, 203, 202, 219, 212, 709/206, 225, 224
See application file for complete search history.

(56) References Cited

U.S. PATENT DOCUMENTS

| | | |
|---|---|---|
| 7,062,546 B1 | 6/2006 | Kolar et al. |
| 7,483,965 B1 | 1/2009 | Gerraty |
| 8,156,213 B1 | 4/2012 | Deng et al. |
| 8,903,938 B2 * | 12/2014 | Vermeulen .......... G06F 9/45533 709/217 |
| 2003/0109262 A1 * | 6/2003 | Scheurich ............... H04W 8/26 455/456.1 |
| 2004/0152474 A1 * | 8/2004 | Chen ..................... H04W 4/02 455/456.3 |
| 2004/0198386 A1 * | 10/2004 | Dupray ................. H04W 64/00 455/456.1 |
| 2007/0287473 A1 * | 12/2007 | Dupray .................. H04W 4/02 455/456.1 |

(Continued)

OTHER PUBLICATIONS

Harrington et al., "An Architecture for Describing Simple Network Management Protocol (SNMP) Management Frameworks," RFC 3411, Network Working Group, Dec. 2002, 58 pp.

(Continued)

*Primary Examiner* — Jude Jean Gilles
(74) *Attorney, Agent, or Firm* — Shumaker & Sieffert, P.A.

(57) ABSTRACT

A system and method for service discovery. A network management system fetches, from a first network device, configuration data associated with a service executing on the first network device. In response to determining that the service extends across multiple network devices, the network management system constructs, based on the configuration data, a first partial service instance associated with the service executing on the first network device. The network management system merges a plurality of partial service instances to form a merged partial service instance, the plurality of partial service instances including the first partial service instance and a second partial service instance associated with the service executing on a different network device. The network management system promotes the merged partial service instance as a service instance.

29 Claims, 19 Drawing Sheets

(56) References Cited

U.S. PATENT DOCUMENTS

| | | | | |
|---|---|---|---|---|
| 2011/0038637 A1* | 2/2011 | Rao | ............ | G06F 3/023 |
| | | | | 398/115 |
| 2011/0246587 A1* | 10/2011 | Marl | ............ | G06Q 10/107 |
| | | | | 709/206 |
| 2013/0185147 A1* | 7/2013 | Letca | ............ | G06Q 30/0241 |
| | | | | 705/14.47 |
| 2013/0304651 A1* | 11/2013 | Smith | ............ | G06Q 20/3227 |
| | | | | 705/67 |
| 2017/0026960 A1* | 1/2017 | Mestanov | ............ | H04W 72/0426 |
| 2017/0300838 A1* | 10/2017 | Bertelli | ............ | G06Q 10/0631 |

OTHER PUBLICATIONS

Enns, "NETCONF Configuration Protocol," RFC 4741, Network Working Group, Dec. 2006, 95 pp.

Bray et al., Extensible Markup Language (XML) 1.0 (Fifth Edition), W3C Recommendation, Nov. 26, 2008, 56 pp.

Thompson et al., XML Schema Part 1: Structures Second Edition, W3C Recommendation, Oct. 28, 2004, 96 pp.

"Juniper Networks Network and Security Manager, Administration Guide," Revision 3, Juniper Networks, Apr. 1, 2011, 1008 pp.

* cited by examiner

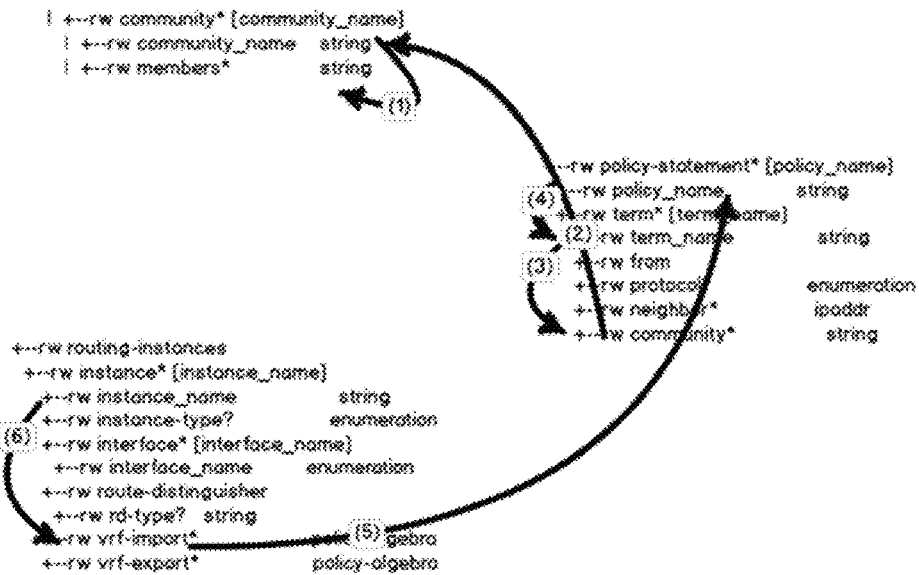

(1) 'members' are located in community list. 'community-name' is also part of the mapping. members are added as neighbors of community_name in the dependency graph.

(2) policy-statement/term/community is a 'leafref' of community/community-name. So community-name is added as neighbor of policy-statement/term/community.

(3) 'community' is found under 'term' list. There is one more path (policy-statement/term/term-name) found in the mapping, which has the prefix 'policy-statement/term'.

(4) 'term-name' is found under the list 'policy-statement'. There is a path in the mapping with the prefix 'policy-statement', which is 'policy-statement/policy-name'.

(5) Again vrf-import and vrf-export are leafrefs of policy_name.

(6) vrf-import is found under the list 'routing-instances/instance'. There is a path ('routing-instances/instance/instance_name') in the mapping which starts with 'routing-instances/instance'. So vrf-import is added as a neighbor to instance_name.

FIG. 7

```
                                        340
<mappings>
 <mapping>
  <configuration>
   <routing-instances>
    <instance>
     <route-distinguisher>
      <rd-type>{/l3vpn/connectivity-settings/route-distinguisher}</rd-type>
     </route-distinguisher>
     <instance-type>vrf</instance-type>
     <vrf-export>export_{/configuration/interface/interface_name}</vrf-export>
     <interface>
      <interface_name>{/configuration/interface/interface_name}</interface_name>
     </interface>
     <vrf-import>import_{/configuration/interface/interface_name}</vrf-import>
     <instance_name>ri_{/configuration/interface/interface_name}</instance_name>
     <vrf-table-label></vrf-table-label>
    </instance>
   </routing-instances>
   <policy-options>
    <policy-statement>
     <policy_name>import_{/configuration/interface/interface_name}</policy_name>
     <term>
      <term_name>import_{/configuration/interface/interface_name}</term_name>
      <then>
       <community>
        <community-name>community_{/configuration/interface/interface_name}</community-name>
       </community>
       <accept_reject>accept</accept_reject>
      </then>
      <from>
       <protocol>bgp</protocol>
       <community>community_{/configuration/interface/interface_name}</community>
      </from>
     </term>
    </policy-statement>
    <community>
     <members>{/l3vpn/connectivity-settings/route-targets}</members>
     <community_name>community_{/configuration/interface/interface_name}</community_name>
    </community>
   </policy-options>
  </configuration>
 </mapping>
</mappings>
```

(c) route-targets are defined as merge attributes for L3-VPN configuration. route-targets are mapped to 'configuration/policy-options/community/members'

```
<configuration>
    <routing-instance>
        <routing-instance-name>ri1</routing-instance-name>
        <instance-type>vrf</instance-type>
        <import-policy>import-policy-1</import-policy>
        <attribute1>value1</attribute1>
    </routing-instance>                                              — 600
    <routing-instance>
        <routing-instance-name>ri2</routing-instance-name>
        <interface>ge-1/2/3</interface>
    </routing-instance>                                              — 602
    <interfaces>
        <interface>
            <interface_name>ge-0/0/1</interface_name>
            <unit>
                <unit-name>0</unit-name>
                <family>inet</family>
            </unit>
        </interface>
        <interface>
            <interface_name>ge-0/0/2</interface_name>
            <unit>
                <unit-name>1</unit-name>
                <family>inet</family>
            </unit>
        </interface>
    </interfaces>
    <routing-options>
        <routing-policy>
            <policy-name>import-policy-1</policy-name>
            <route-target>1200</route-target>
            <neighbor>ge-0/0/3</neighbor>
        </routing-policy>                                            — 604
        <routing-policy>
            <policy-name>import-policy-2</policy-name>
            <route-target>1204</route-target>
            <neighbor>ge-0/0/5</neighbor>
        </routing-policy>                                            — 606
    </routing-options>
</configuration>
```

*FIG. 15A*

```
700   <service>
        <basic-settings>
          <service-name>service_1200</service-name>
        </basic-settings>
        <connectivity-settings>                            710
          <route-target>1200</route-target>
        </connectivity-settings>
        <endpoint-settings>
          <device>1<device>                                712
          <neighbor-interface>ge-0/0/3</neighbor-interface>
        </endpoint-settings>
      </service>

702   <service>
        <basic-settings>
          <service-name>service_1204</service-name>
        </basic-settings>
        <connectivity-settings>                            710
          <route-target>1204</route-target>
        </connectivity-settings>
        <endpoint-settings>
          <device>1<device>                                712
          <neighbor-interface>ge-0/0/5</neighbor-interface>
        </endpoint-settings>
      </service>
```

*FIG. 16*

```
700  <service>
        <basic-settings>
           <service-name>service_1200</service-name>
        </basic-settings>
        <connectivity-settings>
           <route-target>1200</route-target>
           <attribute1>value1</attribute1>                              — 720
        </connectivity-settings>
        <endpoint-settings>
           <device>1<device>
           <neighbor-interface>ge-0/0/3</neighbor-interface>
        </endpoint-settings>
     </service>

702  <service>
        <basic-settings>
           <service-name>service_1204</service-name>
        </basic-settings>
        <connectivity-settings>
           <route-target>1204</route-target>
        </connectivity-settings>
        <endpoint-settings>
           <device>1<device>
           <neighbor-interface>ge-0/0/5</neighbor-interface>
        </endpoint-settings>
     </service>
```

*FIG. 17*

```
800
    <service>
        <basic-settings>
            <service-name>service_1200</service-name>
        </basic-settings>
                                                    810
        <connectivity-settings>
            <route-target>1200</route-target>
        </connectivity-settings>
        <endpoint-settings>
            <device>2<device>                       812
            <neighbor-interface>ge-0/0/1</neighbor-interface>
        </endpoint-settings>
    </service>
802
    <service>
        <basic-settings>
            <service-name>service_1208</service-name>
        </basic-settings>
                                                    810
        <connectivity-settings>
            <route-target>1208</route-target>
        </connectivity-settings>
        <endpoint-settings>
            <device>2<device>                       812
            <neighbor-interface>ge-0/0/7</neighbor-interface>
        </endpoint-settings>
    </service>
```

*FIG. 18*

```
900 <service>
      <basic-settings>
         <service-name>service_1200</service-name>
      </basic-settings>
      <connectivity-settings>
         <route-target>1200</route-target>
         <attribute1>value1</attribute1>
      </connectivity-settings>
      <endpoint-settings>
         <device>1<device>
         <neighbor-interface>ge-0/0/3</neighbor-interface>       912
      </endpoint-settings>
      <endpoint-settings>
         <device>2<device>
         <neighbor-interface>ge-0/0/1</neighbor-interface>       910
      </endpoint-settings>
   </service>
```

*FIG. 20A*

```
902 <service>
      <basic-settings>
         <service-name>service_1208</service-name>
         <attribute1>value2</attribute1>
      </basic-settings>
      <connectivity-settings>
         <route-target>1208</route-target>
      </connectivity-settings>
      <endpoint-settings>
         <device>2<device>
         <neighbor-interface>ge-0/0/7</neighbor-interface>       914
      </endpoint-settings>
   </service>
```

NETWORK CONFIGURATION SERVICE DISCOVERY

TECHNICAL FIELD

The disclosure relates to computer networks and, more particularly, to network configuration within computer networks.

BACKGROUND

Network devices maintain configuration information that defines operation of the network devices. For example, network devices such as routers, switches and gateways maintain tables of routing information that describe routes through the network. Most routers include a control plane, sometimes called a management plane, which maintains the routing information, and a forwarding plane, which forwards received packets according to the routing information. Upon receiving an incoming data packet, the router examines destination information within the packet to identify the destination for the packet. Based on the destination, the device forwards the packet in accordance with a routing table. In the same manner, network devices such as firewalls maintain rules that define the devices and services permitted to cross the firewall.

Network services may be distributed across multiple devices. Some of these services are connectivity services, such as a layer three Virtual Private Network ("L3 VPN") service, a Virtual Private Local Area Network (LAN) Service ("VPLS") and a point to point ("P2P") service, and some are network configuration services, such as "dot1q vlan service."

Network administrators use a network management system (NMS) to discover, monitor and configure devices present on the network. In addition, network administrators use some network management systems to define "custom services" on the fly and to configure the appropriate devices to instantiate the service. The network management system then manages the complete life cycle of each service defined in the NMS.

SUMMARY

In general, a network management system is described that discovers existing service instances running in a network based on device-level configuration. As described, in various examples the network management system discovers existing services running in the network by requesting configuration information from network devices running in the network, constructing from the configuration information partial service instances representing the services executing on each network device, merging the partial service instances determined to be associated with the same service instance, and promoting the merged partial service instances as a service instance associated with the network devices.

In one example, service discovery engine connected through a network management system to a network having network devices executes a build phase in which configuration information read from the network devices is used to build configuration objects related to specific service types, and converts the configuration objects to partial service instances based on the service types. The service discovery engine then merges two or more partial service instances into a merged partial service instance and promotes the merged partial service instance as a service instance associated with one or more network devices.

In one example, a method includes fetching, by a network management system and from a first network device, configuration data associated with a service executing on the first network device; in response to determining that the service extends across multiple network devices, constructing, by the network management system and based on the configuration data, a first partial service instance associated with the service executing on the first network device; merging, by the network management system, a plurality of partial service instances to form a merged partial service instance, the plurality of partial service instances including the first partial service instance and a second partial service instance associated with the service executing on a different network device; and promoting the merged partial service instance as a service instance.

In another example, a service management system includes a service database; one or more service handlers connected to the service database; a processor; and at least one non-transitory computer-readable storage medium storing instructions that are executable by the processor to fetch, from a first network device, configuration data associated with a service executing on the first network device; in response to determining that the service extends across multiple network devices, construct, based on the configuration data, a first partial service instance associated with the service executing on the first network device; merge a plurality of partial service instances to form a merged partial service instance, the plurality of partial service instances including the first partial service instance and a second partial service instance associated with the service executing on a different network device; and promote the merged partial service instance as a service instance.

In yet another example, a non-transitory computer-readable storage medium encoded with instructions that, when executed, cause at least one processor of a computing device to fetch, from a first network device, configuration data associated with a service executing on the first network device; in response to determining that the service extends across multiple network devices, construct, based on the configuration data, a first partial service instance associated with the service executing on the first network device; merge a plurality of partial service instances to form a merged partial service instance, the plurality of partial service instances including the first partial service instance and a second partial service instance associated with the service executing on a different network device; and promote the merged partial service instance as a service instance.

One or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram illustrating an example construction of a dependency graph for the L3-VPN service, in accordance with one or more aspects of the disclosure.

FIG. 8 is a conceptual diagram illustrating an example mapping template, in accordance with one or more aspects of the disclosure.

FIG. 9 is a conceptual diagram illustrating a service discovery engine creating a partial service instance using a dependency graph, in accordance with one or more aspects of the disclosure.

FIGS. 10 and 11 are conceptual diagrams illustrating example default service mapping and device configuration, respectively, in accordance with one or more aspects of the disclosure.

FIGS. 15A and 15B illustrate example device configurations for two routing devices, in accordance with one or more aspects of the disclosure.

FIGS. 16-19 illustrate example partial service instances, in accordance with one or more aspects of the disclosure.

FIG. 20A illustrates an example service instance, in accordance with one or more aspects of the disclosure.

FIG. 20B illustrates an example partial service instance, in accordance with one or more aspects of the disclosure.

DETAILED DESCRIPTION

Figure 1:
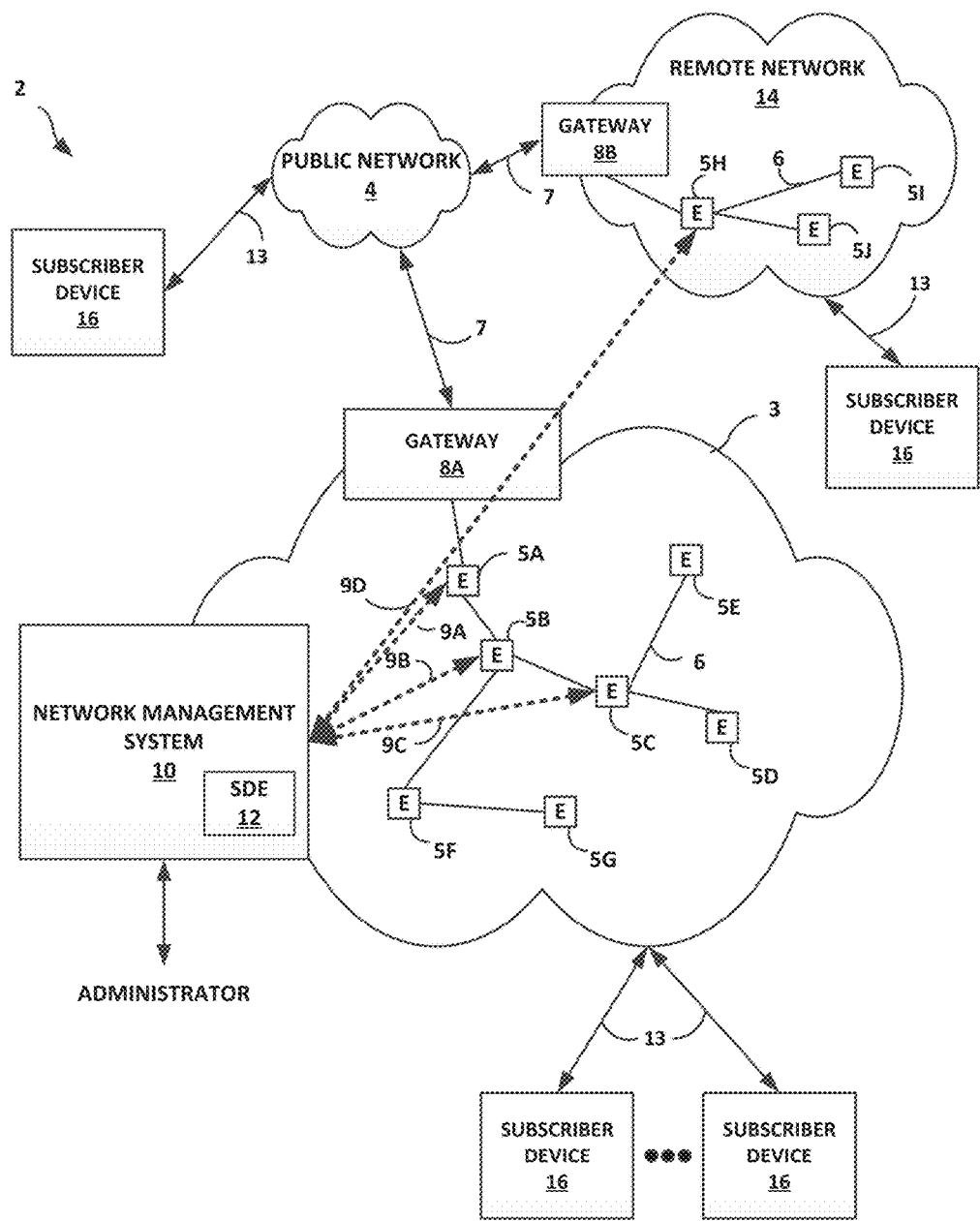
FIG. 1 is a block diagram illustrating an example network management system that manages network resources of an enterprise network, in accordance with one or more aspects of the disclosure.

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are used to refer to different elements of a same or similar type.

As noted above, network administrators use a network management system (NMS) to discover, monitor and configure devices present on the network. In addition, some network administrators use network management systems to define custom services on the fly and to configure the appropriate devices to instantiate the service. The network management system then manages the complete life cycle of each service defined in the NMS.

Such an approach works adequately if the NMS establishes all the services. Network service providers, however, often provide network services to their customers. The services provided by network service providers may range from network configuration services (such as linking customer sites through a network core using VPN services) through subscriber services (such as security services, tunneling, virtual private networks, filtering, load balancing, Voice over Internet Protocol (VoIP)/Multimedia processing and the application of various types of application proxies (such as Hypertext Transfer Protocol (HTTP), Extensible Markup Language (XML) and Wireless Application Protocol (WAP)) to incoming packets. Service providers may provide content-specific services designed to improve the quality of a user's experience (e.g., video streaming and caching).

A problem arises when an NMS is connected to a network with existing services. When first connected to an existing network, a network management system typically has no state regarding any of the service instances already running in the existing network. Existing service instances may number into the tens of thousands. Unaware of the existing service instances, current NMS's, when establishing new network services in a system having existing network services, may set up configurations that conflict with existing service instances. For instance, when an existing P2P service created through a command line interface (CLI) is using a particular UNI interface, that same UNI resource should not be allocated to a P2P service instance created by the network management system.

Furthermore, service configuration can span across multiple devices, creating multiple challenges in reconstructing a service configuration from two or more device configurations. First, as each device may support two or more services, the NMS must split each of the multiple service-related configurations in a single device into the device configurations associated with each service. Second, the NMS must merge aspects of each service configuration determined from the device configuration of each of multiple devices to create a complete service instance.

Techniques are described herein for a system and method for mapping device-level configuration information into service-level configuration information. A network management system capable of supporting not only high-level model to low-level model mapping, but also low-level model to high-level model mapping, with the mapping from low-level model to high-level model dependent on each device's device-level model, provides an advantage in network management, especially in networks which encounter network devices configured for existing services.

In one example approach, a network management system fetches, from a first network device, configuration data associated with a service executing on the first network device. The NMS constructs, based on the configuration data, a first partial service instance associated with the service executing on the first network device. The NMS merges the first partial service instance with a partial service instance associated with the service executing on a different network device and promotes the merged partial service instance as a service instance. In one such example approach, when the NMS promotes the merged partial service instance as a service instance, the NMS stores the service instance as a service object in a service database. The service object includes service-level configuration information associated with the service instance.

In one example approach, in a service-designer workflow, a service-level model defines a service and a mapper/template relates the service-level model to a device-level model associated with a device (per the device's YANG model). In one example approach, the NMS uses the service-level model, the mapper/template, the device's data model (e.g., YANG model) and the device configuration imported from each device to determine the service-level configuration or configurations that would have resulted in the imported device configuration. In one example approach, the NMS includes two mapping functions (e.g., in Python), one for the forward-mapping from service configuration to device configuration and another for the reverse-mapping.

In this manner, in accordance with the techniques of this disclosure, the network management system is able to discover existing service instances running in a network. As described herein, in various examples the network management system discovers existing services running in the network by requesting configuration information from network devices running in the network, constructing from the configuration information partial service instances representing the services executing on each network device, merging the partial service instances and promoting the merged partial service instances as a service instance associated with the network devices. In one example approach, a service discovery engine connected through a network management system to a network having network devices executes a build phase in which configuration information read from the network devices is used to build configuration objects related to specific service types and converts the configuration objects to partial service instances based on the service types. Two or more partial service instances are merged into a merged partial service instance and the merged partial service instance is promoted as a service instance associated with one or more network devices.

In one example approach, the network management system includes a service model associated with each type of service. When the service model is created, the structure of the service model is read and understood by the NMS in the form of a dependency graph built based on leafrefs and containment hierarchy in the device model, and mappings and merge attributes defined in the service model.

In one example approach, each service model includes a merge strategy. The network management system uses the merge strategy to combine the partial service instances constructed from two or more devices into a service instance. In one such example approach, when a user defines a service, the NMS suggests possible merge strategies to the user.

In one example approach, when network management system 10 discovers a device, network management system 10 splits the configurations in the device into multiple partial service instances by, for example, service type. This is referred to herein as the "build phase." Then, based on the merge strategy, network management system 10 merges the partial service instances found on the devices with partial service instances found on other devices to form a service instance. These functions are described in greater detail below.

FIG. 1 is a block diagram illustrating an example network management system that manages network resources of an enterprise network, in accordance with one or more aspects of the disclosure. In the example of FIG. 1, a network management system 10 discovers existing service instances running in a network 2. As described below, in various examples the network management system discovers existing configuration services running in the network by requesting configuration information from network devices running in the network, constructing partial service instances representing the services, merging the partial service instances and promoting the merged partial service instances as a service.

In the example of FIG. 1, network management system 10 manages services provided by network elements 5A-5J (collectively, "network elements 5") and gateways 8A and 8B (collectively "gateways 8") of network 2. In some such example approaches, managed network elements 5 and managed gateways 8 of network 2 are network devices interconnected via communication links 6 to form a communication topology in order to exchange resources and information. Network elements 5 may include, for example, routers, switches, other gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, network 2 may transmit data according to any other discrete data unit defined by any other protocol, such as a cell defined by the Asynchronous Transfer Mode (ATM) protocol, or a datagram defined by the User Datagram Protocol (UDP). Communication links 6 interconnecting network elements 5 and gateways 8 may be physical links (e.g., optical, copper, and the like) or wireless links. Network 2 may be an enterprise network, a service provider network or any other network in which managed network devices provide network services to packet flows.

In some example approaches, two or more network elements 5 (e.g., routers, switches, firewalls or gateways) may be configured in a distributed system of devices (nodes) that together act as a single network service device. Because distributed routing systems comprise multiple devices, distributed routing systems may be able to route larger volumes of network traffic than individual routing devices and may be able to provide more network services than individual routing devices. Similarly, distributed firewall systems may be able to process larger volumes of network traffic than individual firewall systems and may be able to provide more granular services than individual firewall devices.

As shown in FIG. 1, in one example approach, network 2 includes a workgroup network 3 connected through a public network 4 (e.g., the Internet) to a remote network 14. In one example approach, workgroup network 3 is connected to public network 4 via a communication link 7 connected to gateway 8A and is connected through public network 4 to a remote network 14 via a second communications link 7 from public network 4 to gateway 8B of remote network 14. Subscriber devices 16 may be connected to workgroup network 3 through a communications link 13 to a gateway 8, and to public network 4 or remote network 14 via similar communication links 13. Public network 4 and remote network 14 may provide access to web servers, application servers, public databases, media servers, end-user devices, and other types of network resource devices and content.

Network devices in public network 4 may present a number of security threats to network 2. For example, devices in public network 4 may attempt to deliver worms, trojans, and/or viruses to one or more of network elements 5. As another example, a hacker using a device in public network 4 may attempt to infiltrate elements of network 2 to snoop, corrupt, destroy, or steal information stored by one or more of the network elements 5.

In the example shown in FIG. 1, network management system 10 is communicatively coupled to network elements 5 for configuring and managing the network elements, including controlling operations of the network elements and the services provided by the network elements. In some example approaches, network management system 10 communicates with a management interface (e.g., CLI interface) of each network element 5 via network links 6. In some such example approaches, network management system 10 uses a network management protocol designed for management of configuration data within managed network elements 5, such as the CLI protocol, the SNMP protocol or the Network Configuration Protocol (NETCONF) protocol or a derivative thereof, such as the Juniper Device Management Interface, to configure and manage the network elements. In some example approaches, network management system 10 is coupled directly to the various elements 5. In some example approaches, network management system 10 is coupled indirectly to various elements 5 and directly to others.

Workgroup network 3, public network 4 and remote network 14 may provide services to subscribers via subscriber devices 16. In one example approach, a network service provider who administers at least parts of network 2 may offer services to subscribers associated with devices with access to network 2. Services offered may include, for example, traditional Internet access, Voice-over-Internet Protocol (VoIP), video and multimedia services, security services, and linking customer sites through network 2 using one of a point-to-point Ethernet service, multipoint-to-multipoint Ethernet service, point-to-multipoint Ethernet service, full-mesh L3VPN, and hub-and-spoke L3VPN, for instance. Network 2 may support multiple types of access network infrastructures that connect to enterprise network access gateways to provide access to the offered services.

In general, any one or more of subscriber devices 16 may request authorization and data services by sending a session request to a gateway 8. In turn, the gateway 8 typically accesses an Authentication, Authorization and Accounting (AAA) server (not shown) to authenticate the subscriber device requesting network access. Once authenticated, any of subscriber devices 16 may send subscriber data traffic toward network 2 in order to access and receive services provided by workgroup network 3, by public network 4 or by remote network 14, and such packets may traverse network 2 as part of at least one packet flow. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device 16 may originate multiple packet flows upon authenticating to enterpriser network 2 and establishing a communication session for receiving data services.

Similarly, any one or more of subscriber devices 16 connected to public network 4 or to remote network 14 may request authorization and data services by sending a session request to a gateway 8 of network 2. Once authenticated, any of subscriber devices 16 may send subscriber data traffic toward network 2 in order to access and receive services provided by network 2 or by public network 4, and such packets may traverse network 2 as part of at least one packet flow.

In one example approach, upon detecting a new traffic flow, a gateway 8 may authenticate new subscribers to the AAA server, e.g., by way of the RADIUS or Diameter protocols, and, at this time, may receive a service request or other information that defines the services to be applied to the subscriber or that maps the various traffic expected for the subscriber to one or more service flows. Upon detecting a new flow, a gateway 8 may select a service chain for the flow based on the service profile and traffic type. For example, a gateway 8 may select a service chain for the packet based on the service profile received for the subscriber and/or based on the type of traffic, e.g., HTTP traffic or VoIP traffic.

As noted above, the various networks of network 2, i.e., workgroup network 3 and remote network 14 include network resources (network elements 5 and gateways 8) configurable by network management system 10 as part of provisioning services for use by customers/subscribers of the network 2. Any of the network resources may represent a device to be configured (DTC), such as a router, switch, optical device, Converged Cable Access Platform (CCAP) element, microwave element, passive optical network element, a service node, a virtual machine executing a service, a virtual router for a BGP IP VPN, and other network elements. In some examples, any of network elements 5 and gateways 8 may alternatively or additionally represent one or more hardware or software components of a given DTC, such as a hardware or software interface, a service line card, a forwarding line card, a network link, a label-switched path (LSP), a routing instance (e.g., a virtual routing and forwarding instance (VRF)), etc. In other words, a DTC may include multiple network elements 5 or multiple gateways 8, or combinations thereof, so long as each of the network resources are capable of being separately and synchronously configured without loss of integrity to the operation of any of the network resources.

Once network elements 5A-5J and gateways 8A and 8B are deployed and activated, an administrator may use network management system 10 to manage the network devices using a device management protocol. One example device protocol is the Simple Network Management Protocol (SNMP) that allows network management system 10 to traverse and modify management information bases (MIBs) that store configuration data within each of managed network elements 5. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the description of which is incorporated herein by reference.

In common practice, network management system 10 and the network elements 5 and gateways 8 managed by network management system 10 are centrally maintained by an IT group of the enterprise and are collectively referred to as an element management system (EMS) or a network management system (NMS). In either case, a user/administrator interacts with network management system 10 to remotely monitor and configure network elements 5. For example, the administrator may receive alerts from network management system 10 regarding any of network elements 5 or gateways 8, view configuration data of network elements 5 and gateways 8, modify the configurations data of network elements 5 and gateways 8, add new network devices to network 2, remove existing network devices from network 2, or otherwise manipulate the network 2 and network devices therein. Although described with respect to an enterprise network, the techniques of this invention are applicable to other network types, public and private, including LANs, VLANs, VPNs, and the like.

Responsive to configuration input from the user, network management system 10 communicates with managed devices 5 to provision network services provided by the managed devices. In some approaches, network management system 10 may use a network management protocol designed for management of configuration data within managed network elements 5, such as the CLI protocol, the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in R. Enns et al., RFC 4741: "NETCONF Configuration Protocol," Network Working Group, the Internet Engineering Task Force draft, December 2006, available at http://tools.ietf.org/html/rfc4741, the description of which is incorporated herein by reference. In some approaches, network management system 10 may establish NETCONF sessions with one or more of network elements 5. In the example of FIG. 1, for example, network management system 10 participates in NETCONF sessions 9A-9D with network elements 5A-5C and 5H, respectively.

In some example approaches and as shown in FIG. 1, network management system 10 includes a service discovery engine (SDE) 12. SDE 12 receives device configuration information read by NMS 10 from network devices and determines, from the device configuration information, service configuration information associated with existing services in network 2. In some such approaches, SDE 12 uses the service-level model, the mapper/template, the device's YANG model and the device configuration imported from each device to determine the service-level configuration or configurations that would have resulted in the imported device configuration.

Figure 2:
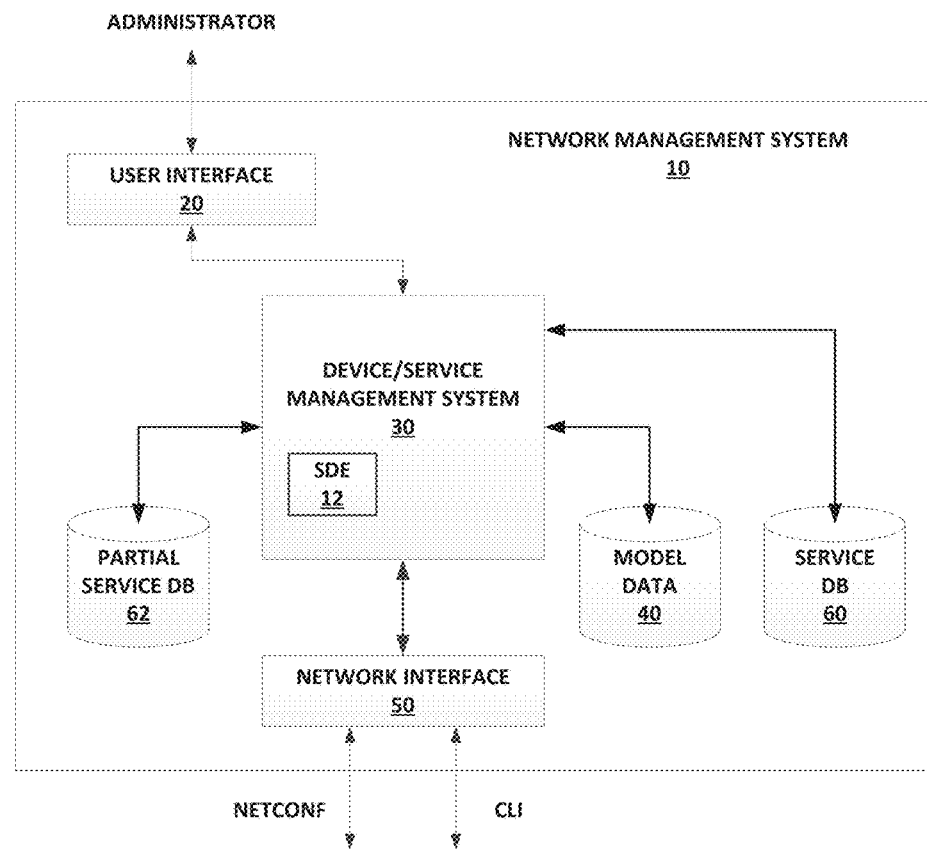
FIG. 2 is a block diagram illustrating an example network management system having a service discovery engine (SDE), in accordance with one or more aspects of the disclosure.

FIG. 2 is a block diagram illustrating an example network management system having a service discovery engine (SDE), in accordance with one or more aspects of the disclosure. In the example of FIG. 2, network management system 10 includes a user interface (UI) 20 connected to a device/service management system 30. Device/service management system 30 configures network elements 5 and gateways 8 via network interface 50 and reads configuration information from network elements 5 and gateways 8 via network interface 50. In some example approaches, network management system 10 includes model data storage 40, service database 60 and partial service database 62. In some such example approaches, device/service management system 30 receives information on network elements 5 and gateways 8 from model data storage 40 and configures network elements 5 and gateways 8 based on that information via network interface 50. In some such example approaches, device/service management system 30 receives information on services from model data storage 40 and configures services on network 2 based on that information via network interface 50. In some example approaches, SDE 12 receives, via network interface 50, device configuration information read from one or more network devices such as network elements 5 and gateways 8. SDE 12 determines the service configuration information corresponding to the received device configuration information as a function of a service model, a device model, the device configuration information and a mapping function that maps the device configuration information to service configuration information corresponding to the provided service. In one example approach, SDE 12 stores partial service instances as they are determined in partial service database 62, and then merges the partial service instances into a service instance before storing the service instance as a service object in service database 60.

In some example approaches, user interface 20 presents visual interfaces that are responsive to user input received from an administrator via peripheral devices. For example, user interface 20 may comprise a graphical user interface (GUI) or a command line interface (CLI). For human-cognizable presentation, user interface 20 may be coupled to a computer monitor, a television, a projector, speakers, or other audio and video output devices (not shown). To receive user input, user interface 20 may be coupled to a keyboard, a mouse, or other peripherals. In some example approaches, user interface 20 comprises the user interface for a Juniper Networks NSM.

In one example approach, device/service management system 30 establishes communication through network interface 50 with each network element 5 and gateway 8 to be configured and configures the device or devices based on information stored in model data storage 40 for that network resource and, in the case of services, for that service. In one example approach, network interface 50 includes, e.g., a network interface card having an Ethernet interface. In some such example approaches, network interface 50 is communicatively coupled to network elements 5 and/or gateways 8 via communication links 6, or via other serial or parallel data communication approaches.

In some example approaches, network management system 10 may use a network management protocol designed for management of configuration data within managed network elements 5, such as the CLI protocol, the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. In some approaches, network management system 10 may establish NETCONF sessions with one or more of network elements 5.

In one example approach, device/service management system 30 establishes communication through network interface 50 with each network element 5 and each gateway 8 to be involved in providing a service and configures each device using a network service editor 15 based on information stored in model data storage 40 for the service and for the network elements 5 and gateways 8 used to provide that service. As noted above, network management system 10 may use a network management protocol designed for management of configuration data within managed network elements 5, such as the CLI protocol, the SNMP protocol or the Network Configuration Protocol (NETCONF) protocol or a derivative thereof, such as the Juniper Device Management Interface, to perform the service configuration.

In some example approaches, device/service management system 30 configures two or more network elements 5 to operate together in a distributed routing system. In some such example approaches, other network elements 5 in network 2 may receive flows of network traffic from the distributed routing system. Such flows of network traffic may include packets, frames, cells, or other communication units. Each flow of network traffic originates at one of the network elements 5 and is destined for a different one of the network elements 5. Upon receiving data in a flow of network traffic, one or more network elements 5 may apply one or more services to the flow of network traffic. For example, upon receiving data in a flow of network traffic, one of the network elements 5 may scan the data for malware, such as computer viruses.

In some example approaches, device/service management system 30 reads, from devices within network 2, device configuration information corresponding to services that are running on network 2 but that are missing from service database 60. In accordance with the techniques of this disclosure, SDE 12 reverse-maps the device configuration information into service configuration information and, from there, SDE 12 combines the device configuration information into a corresponding service instance saved as a service object to service database 60.

Figure 3:
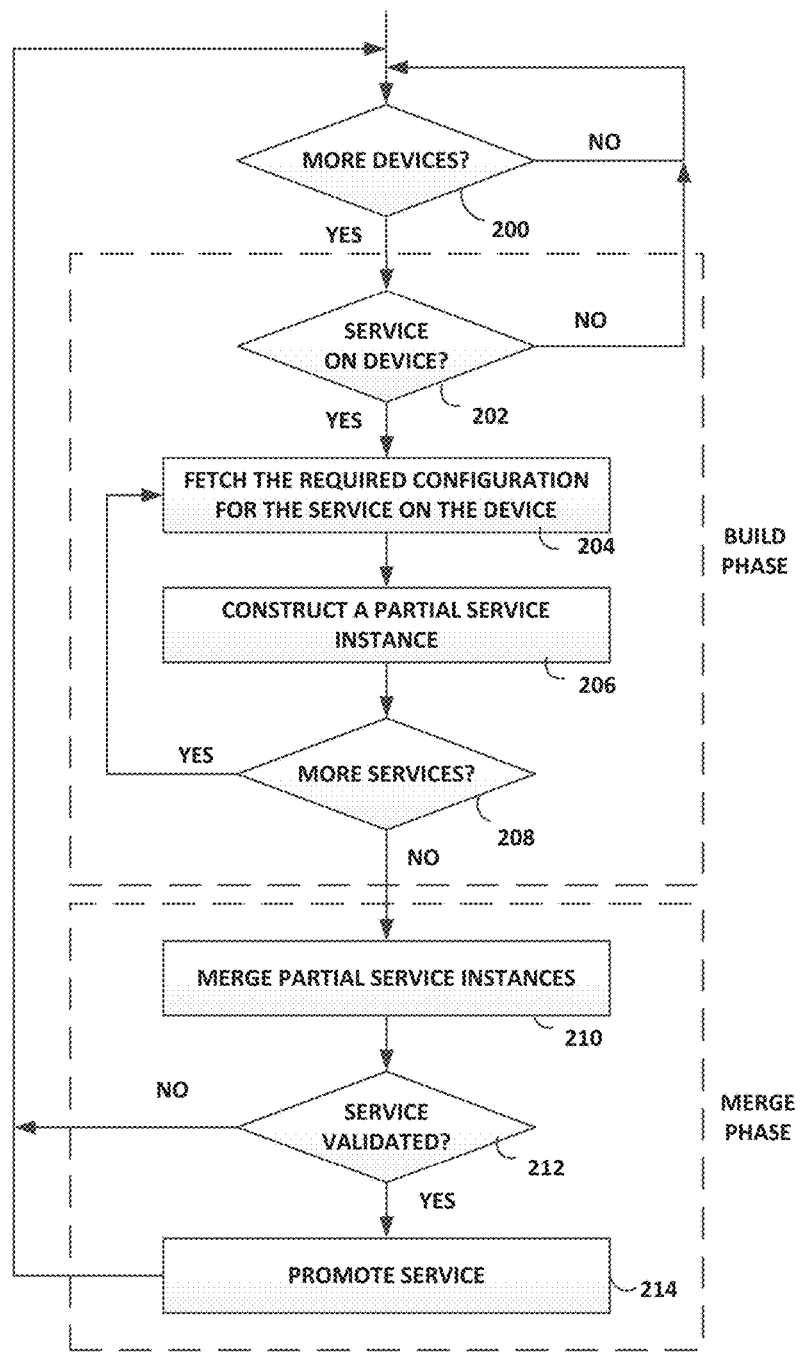
FIG. 3 is a flowchart illustrating an example method of discovering existing service instances running in network devices being brought under the control of a network management system, in accordance with aspects of the disclosure.

FIG. 3 is a flowchart illustrating an example method of discovering existing service instances running in network devices being brought under the control of a network management system, in accordance with aspects of the disclosure. As noted above, network management system 10 discovers existing configuration services running in network 2 by requesting configuration information from network devices 5 and/or 8 running in network 2. In the example shown in FIG. 3, service discovery engine 12 executes a build phase in which configuration information read from the network devices is used to build configuration objects related to specific service types. These partial service instances describe only an aspect of the service being discovered; the partial service instances are stored in a partial service database 62 until enough partial service instances are collected to determine a service instance. Once network management system 10 has discovered enough partial service instances associated with a service to complete the service instance, network management system 10 enters a merge phase, the partial service instances are merged and then promoted as a service instance.

In one example approach, network management system 10 determines if there are new network devices to be brought under management of network management system 10. If so, network management system 10 determines whether there are service instances running on the network devices that are being brought under management of network management system 10. If so, network management system 10 characterizes the services by fetching required configuration information for the service from each device and then adds the service to network management system 10 as a new service under management of NMS 10.

In one such approach, once a device is managed, network management system 10 builds configuration objects, which are related to one or more specific service types. Each network device may contain multiple instances of the same service type; in one such approach, system 10 links all the objects that are related to a specific instance. In some approaches, that linking of the objects may require the use of a "dependency graph" that captures the relationship across the configuration objects that are related to a particular service. In one such approach, as soon as the service definition is uploaded, the dependency graph is constructed from a mapper/translator.

Once all partial service instances are discovered, network management system 10 merges the partial service instances and promotes the merged partial service instances as a service instance. In some example approaches, a merge strategy configured on the network management system 10 defines how the partial service instances should be merged and promoted as a service instance. In one such example approach, network management system 10 attaches the merge strategy to a service's YANG model.

In the example of FIG. 3, service discovery engine 12 at 200 determines if there are any network devices in the network that have not been reviewed for existing services. If service discovery engine 12 determines there are not any network devices that remain to be reviewed for existing services, service discovery engine 12 remains at 200 and continues to monitor for network devices being added to network 2. If, however, if service discovery engine 12 determines there are network devices that have not been reviewed for existing services, service discovery engine 12 selects one of the network devices at 200 and determines whether any existing services are running on that network device (202). If not, SDE 12 returns to 200 and continues to monitor for network devices being added to network 2. If, however, with the check at 202, service discovery engine 12 determines that there are existing services running on the network device, SDE 12 fetches configuration information associated with the service from the device at 204 and constructs a partial service instance at 206.

At 208, service discovery engine 12 determines if there are any existing services on the device that have not been reviewed and, if so, control returns to 204, where SDE 12 fetches configuration information associated with the service from the device at 204 and constructs a partial service instance at 206. In some example approaches, SDE 12 saves each partial service instance to partial service database 62 as it is constructed. If, at 208, service discovery engine 12 determines that there are no existing services on the network device that have not been reviewed, control moves to the merge phase, and SDE 12 merges the partial service instances with other similar partial service instances, if any, at 210 and save the results in partial service database 62. SDE 12 checks at 212 if any of the merged partial service instances passes service validation. If one or more of the merged partial service instances pass service validation, SDE 12 promotes the merged partial service instances as service instances at 214. In one example approach, as part of this process, SDE 12 saves system configuration information corresponding to the service instance as a service object to service database 60. Control then moves to 200, where service discovery engine 12 determines if there are any network devices that have not been reviewed for existing services.

In another example approach, as SDE 12 discovers each device, SDE 12 reads the device configuration for the device and creates partial service instances for each service on the device, all as part of the build phase. SDE 12 then enters merge phase for each device and SDE 12 keeps adding the partial service instances and then persists the partial service instance back to the partial service database 62. When a partial service passes the service validation, it means that it is complete and SDE 12 moves the new service instance to service DB 60. Even after SDE 12 moves a service instance to the service DB, SDE 12 can merge the service instance with later constructed partial service instances.

Figure 4:
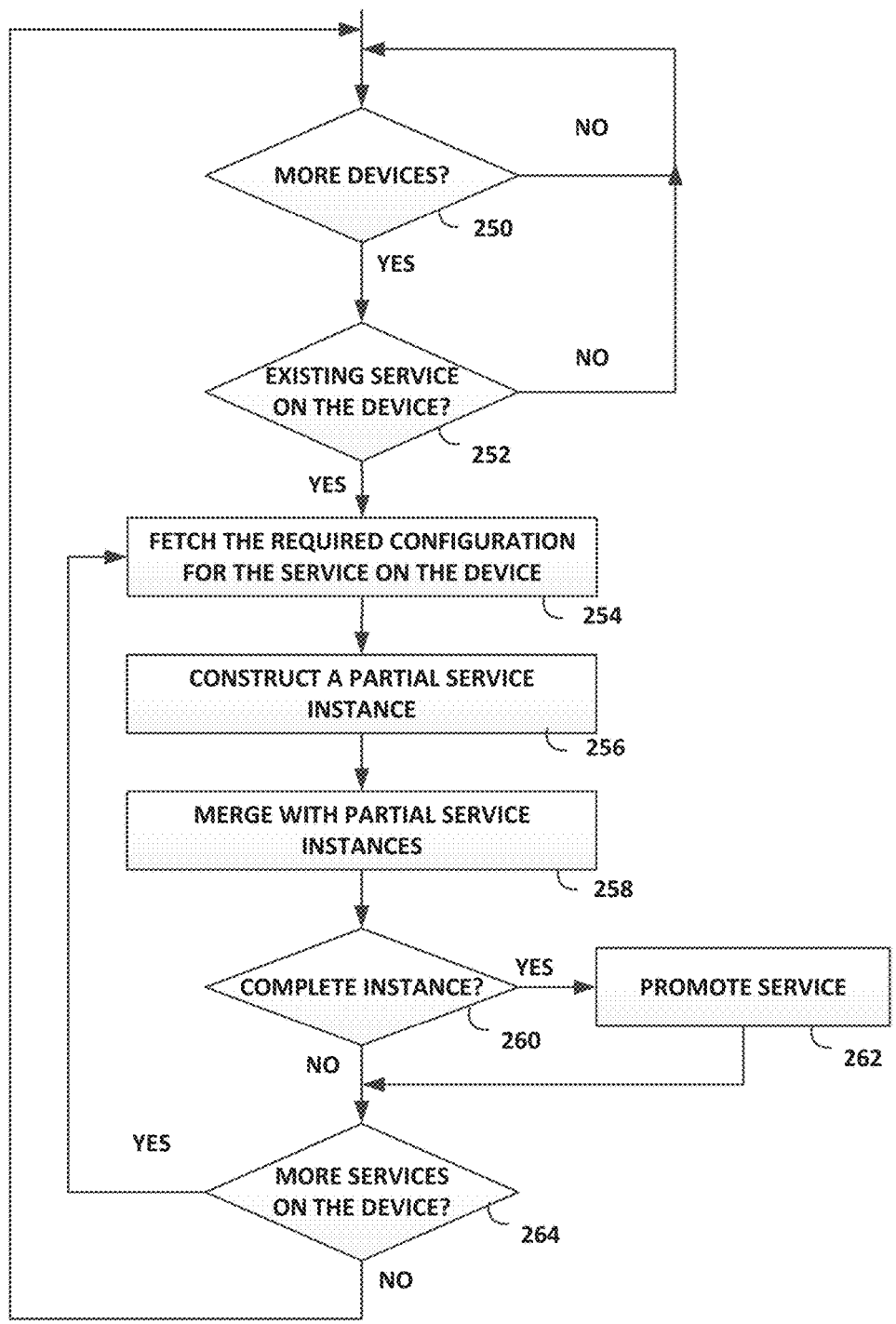
FIG. 4 is a flowchart illustrating another example method of discovering existing service instances running in network devices being brought under the control of a network management system, in accordance with aspects of the disclosure.

FIG. 4 is a flowchart illustrating another example method of discovering existing service instances running in network devices being brought under the control of a network management system, in accordance with aspects of the disclosure. As noted above, network management system 10 discovers existing configuration services running in network 2 by requesting configuration information from network devices 5 and/or 8 running in network 2. In the example shown in FIG. 4, service discovery engine 12 reads device configuration information from the network devices being added to network 2 and develops partial service instances associated with one or more services. SDE 12 stores the partial service instances in partial service database 62 and combines the partial service instances to form service instances. SDE 12 then stores the service instances to service database 60 where they can be used to create new service instances or to make changes in the services associated with a particular service instance.

In the example of FIG. 4, SDE 12 performs a check at 250 to determine if there are any network devices that have not been reviewed for existing services. If there are not any network devices that remain to be reviewed for existing services, SDE 12 remains at 250 and continues to monitor for network devices being added to network 2. If, however, SDE 12 finds that there are network devices that have not been reviewed for existing services, SDE 12 selects one of the network devices at 250 and determines at 252 if any existing services are running on that network device. If not, SDE 12 returns to 250 and continues to monitor for network devices being added to network 2. If, however, the check at 252 determines that there are existing services running on the network device, service discovery engine 12 fetches configuration information associated with the service from the device at 204 and constructs a partial service instance at 206.

At 208, SDE 12 determines whether there are any existing services on the device that have not been reviewed and, if so, SDE 12 returns to 204, where SDE 12 fetches configuration information associated with the service from the device at 204 and constructs a partial service instance at 206. If SDE 12 determines at 208 that there are no existing services on the network device that have not been reviewed, SDE 12 moves to the merge phase, where SDE 12 merges the partial service instances at 210 and promotes the merged partial service instances as a service instance at 212. In one example approach, SDE 12 saves system configuration information corresponding to the service instance as a service object to service database 60. SDE 12 then moves to 200, and determines if there are any network devices that have not been reviewed for existing services.

Figure 5:
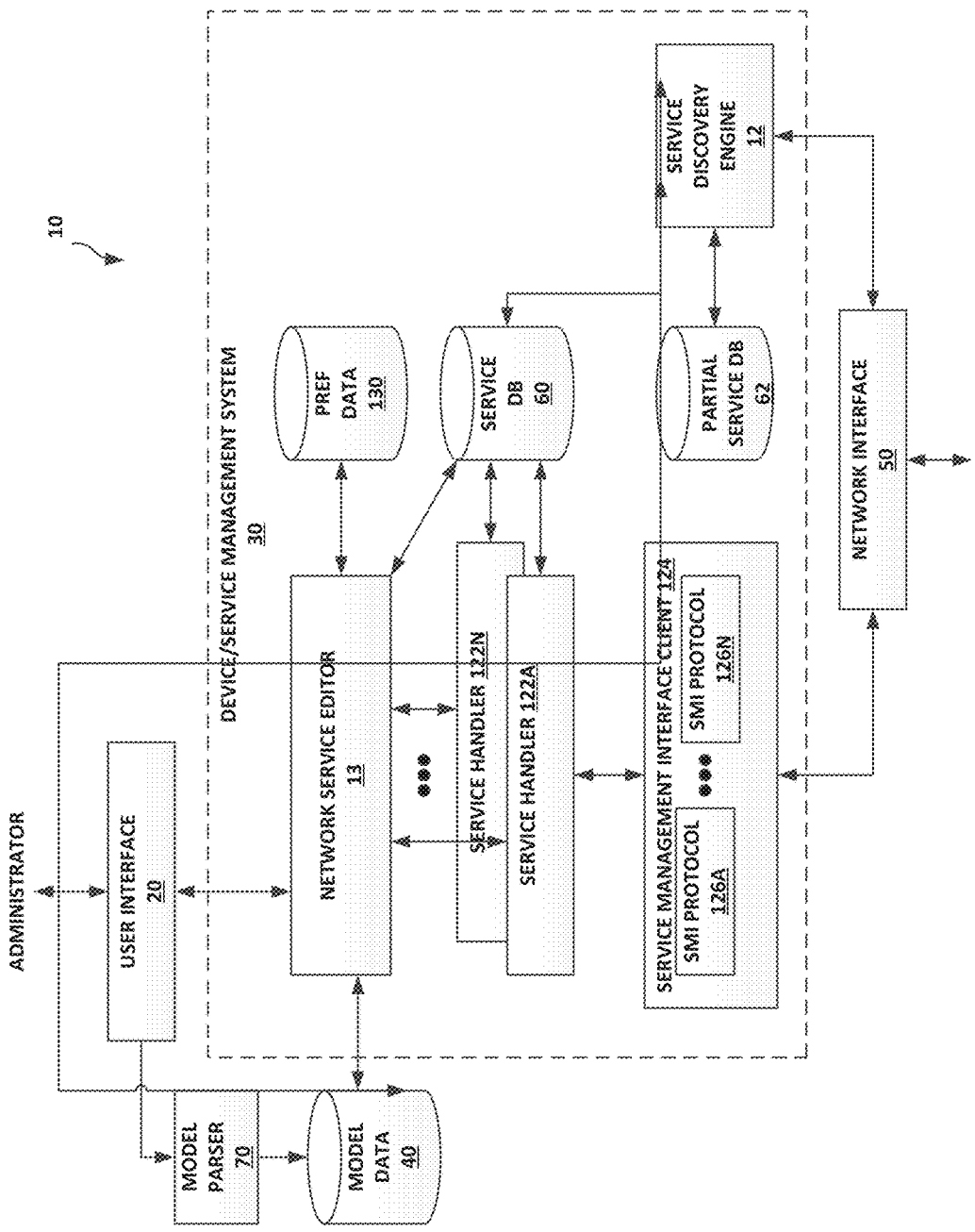
FIG. 5 is a block diagram illustrating an example network management system with a device/service management system, in accordance with one or more aspects of the disclosure.

FIG. 5 is a block diagram illustrating an example network management system with a device/service management system, in accordance with one or more aspects of the disclosure. In one example approach, device/service management system 30 includes a service discovery engine 12 capable of discovering existing network services and a network service editor 15 capable of creating new services and changing the configuration of existing network services. An administrator interacts with device/service management system 30 via user interface 20 to locally maintain and modify preference data store 130 and service database 60, and to convey changes in service configuration to the appropriate element(s) 5. In the example shown in FIG. 5, service discovery engine 12 receives an indication that one or more network devices have been added to network 2. Service discovery engine 12 characterizes each new network device based on its YANG device model and imports device configuration information from the network devices in order to determine the number and types of service instances existing in network 2 but unknown to NMS 10 in, for example, the manner discussed in FIGS. 3 and 4 above.

In the example shown in FIG. 5, a network service editor 15 receives commands from user interface 20 and displays configuration data back to user interface 20. In some example approaches, service configuration information may include schema read from model data storage 40, system preferences read from preference data store 130 or service configuration data read from service database 60.

In the illustrated example, network management system 10 includes a model parser 70 used to create schemas to be stored in model data store 40. In some such example approaches, device model parser 70 converts device model information received from the manufacturer of a device to a schema associated with the device before storing the new schema in device model storage 40.

In some example operations, device/service management system 30 receives service requests to validate, provision, and/or manage services provided by network 2. The service requests may be in the form of data-interchange formatted messages. In some example approaches, service requests arrive via one or more of network interface 50 and user interface 20. In some example approaches, for instance, device/service management system 30 receives a service request message requesting network services at user interface 20. In some examples, user interface 20 is implemented according to a stateless, client-server communications architecture. The stateless, client-server communications architecture may rely on a protocol that is cacheable. As an example, interface 20 may be implemented according to a representational state transfer (REST) software architecture to send and receive messages seeking to validate, provision, and/or manage services provided by network 2. Interface 20 may execute HTTP as an application protocol in some cases.

A service request may include a definition of one or more services and/or resources of a network requested by a customer. As one example, a service request may specify a Virtual Private Network (VPN) service for a customer between one or more customer sites. In some example approaches, network management system 10 discovers network resources by means of routing protocols such as Interior Gateway Protocols (IGPs), as well as management protocols/methods such as NETCONF/YANG. In addition, network management systems 10 may discover the network state by gathering load status, statistics, counters, alarms, and health indications by using management methods such as NETCONF/YANG, Simple Network Management Protocol (SNMP), Transport Layer Interface (TLI), and/or Common Object Request Broker Architecture (CORBA).

In the example shown in FIG. 5, device/service management system 30 includes one or more service handlers 122A-122N (collectively, "service handlers 122"), with each service handler capable of realizing the state of the network represented by the service request by configuring network elements 5 and gateways 8. That is, service handlers 122 may translate the high-level data model of the service abstraction defining the service into a lower level form suitable for interacting with network elements 5 and gateways 8 of network 2. A device/service management system 30 that receives the request message may validate the request included in the message and provision the service if sufficient network resources exist to satisfy the request. In this way, user interface 20 and service handlers 122 may provide a flexible service abstraction layer for device/service management systems 30 that can support fast-changing service types, adapt to real time network resources, and enforce business logic.

In some example approaches, service handlers 122 of device/service management system 30 independently execute path computation algorithms to calculate paths and assign loads among network elements 5. Each of service handlers 122 may, for instance, represent a software process or process routine executed by a thread of a multi-threaded process that executes service handlers 122. In some instances, an administrator deploys multiple instances of device/service management system 30, each of which may include two or more parallel instances of service handler 122.

In some examples, service handlers 122 of device/service management system 30 independently and in some cases synchronously (i.e., at the same time) configure network 2 by issuing commands to elements of network 2 that include network elements 5 and gateways 8. The commands may, for instance, establish paths through network 2. For this purpose, the service handlers 122 may use routing protocols, signaling protocols such as Multiprotocol Label Switching (MPLS) Resource Reservation Protocol with Traffic Engineering extensions (RSVP-TE), Generalized MPLS, or configuration protocols such as NETCONF/Yang, SNMP, PCEP, or other protocols for installing state or otherwise controlling elements of network 2. In the example approach shown in FIG. 5, service provisioning may be provided by two or more service handlers operating in parallel under control of network service editor 15.

In some example approaches, user interface 20 may be invoked by other network management systems 10 in a hierarchical arrangement of controllers or by an orchestrator, administrator, or other entity, to modify a configuration state in preference data store 130 or extract operational state of the service data model 131. For example, user interface 20 may be used for integration with an orchestration system such as OpenStack, may be used by an application such as an Operations Support Systems (OSS)/Business Support Systems (BSS), or may present a RESTful Application Programming Interface (API).

In some example approaches, each of service handlers 122 includes similar components to perform similar functionality, said components and functionality being described hereinafter with respect to service handler 122A. In some such example approaches, service database 60 stores service objects that represent instantiated services within a formal service data model. The high-level service model may include, e.g., a demand calendar and constraints upon the network directed by the provider/enterprise. Service handlers 122 transform the service objects in service database 60 from the high-level service data model to corresponding lower-level objects in a technology data model. In some example approaches, service handler 122 includes a schema transformer which takes schema from model data storage 40 and uses the schema to convert a service data model to a technology data model used to configure services associated with network elements 5 and gateways 8. Whereas the high-level service data model describes services previously requested and instantiated or being processed for eventual instantiation with the network segment under control of device/service management system 30, the low-level technology data model describes how those services are implemented or are to be implemented within network 2.

In some example approaches, the technology data model is stored with the service data model in service database 60. The technology data model may include, for example, an object that describes a TE-LSP that at least partially implements a service in service database 60. In some example approaches, the technology data model further includes identifiers of network resources of the network managed by device/service management system 30, such as network resources of service provider network 2. The technology data model may further include configuration state that describes respective configurations of the network elements as well as operational state that describes respective operational characteristics of the network elements, such as load, available bandwidth, etc.

A high-level service data model describes the desired state of the network under the control of device/service management system 30 at a very high level of abstraction, using objects that map directly to services provided to end users—for example, a virtual network, a connectivity policy, or a security policy. A low-level technology data model, on the other hand, describes the desired state of the network at a very low level of abstraction, using objects that map to specific network protocol constructs such as a BGP route target or a VxLAN network identifier. Accordingly, in some example approaches, service management interface (SMI) client 124 executes one or more SMI protocols 126A-126K (collectively, "SMI protocols 126") to obtain configuration state and operational state from and inject configuration state and operational state into segments of network 2 under the control of device/service management system 30.

In one example approach, configuration state and operational state are stored as objects intelligible to SMI protocols 126 and are mapped to constructs of SMI protocols 126. In this way, device/service management system 30 makes the state of the network under control of device/service management system 30 match the desired state of the network as configured via the user interface 20 and as represented by the service data model.

In one example approach, SMI protocols 126 include protocols for path provisioning as well as for topology discovery. For example, SMI protocols 126 may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, and SNMP.

Once service objects have been edited for certain properties, the "diff" for the objects may be generated. The diff may be, for example, Netconf-based. Service handler 122 takes the diff for all the changes and merges them into service database 60 for deployment to managed elements 5, thereby facilitating single or bulk management of services deployed within a network.

As described above, device/service management system 30 has access to schemas in model data storage 40. In one example approach, model data storage 40 includes a device-specific schema for each of the network elements 5 and gateways 8 managed by device/service management system 30. Device/service management system 30 uses known schemas (e.g., extensible markup language (XML) schemas typically in the form of XML Schema Definition (XSD) documents) that specify the proper means for interacting with and configuring network elements 5 and gateways 8 in order to manage policy configurations for network elements 5 and gateways 8. Further information on XML documents and XSD documents can be found in Extensible Markup Language (XML) 1.0 (Fifth Edition), W3C Recommendation 26 Nov. 2008, and XML Schema Part 1: Structures Second Edition, W3C Recommendation 28 Oct. 2004, respectively, the entire contents of both are incorporated herein by reference.

The schemas stored in model data storage 40 are typically supplied by the manufacturer of a managed device, such as one of network elements 5, and are generally stored as flat files or databases, though they may in some instances be stored as another data structure. In some example approaches, device/service management system 30 obtains policy schemas from a remote storehouse, such as the Juniper Networks Schema Repository, a publicly accessible resource that is updated with each network device release. The Juniper Networks Schema Repository enables access to XSD and XML files defined for each network device, model, and software version. In such example approaches, device/service management system 30 may cache a copy of the appropriate schemas for network elements 5 and gateways 8 within model data storage 40.

In general, an XML-based device schema for a managed device specifies appropriate syntactical structure for XML configuration files that, when produced by device/service management system 30 in compliance with the schema, will be received and understood by the corresponding managed device so as to configure the managed device. For example, a schema may be used to describe to device/service management system 30 the elements and attributes that can properly be present within the XML configuration file for that configuration file to be considered valid for a given managed device in view of the specifications of the device, the functions provided by the device, the network requirements for configuration of the device such as an Internet protocol (IP) address and hostname for the device, and mechanisms by which device/service management system 30 interacts with the managed device.

One example approach for service discovery is described in the context of FIGS. 6-10, which describe the discovery of an L3-VPN service. As noted above, network configuration services are typically spread across multiple devices. Some of these services are connectivity services such as "L3 VPN", "VPLS", "P2P." Other network configuration services are services such as "dot1q vlan service."

As noted above, a low level schema dependency graph may be used in the build phase to capture the relationship across configuration objects that are related to a service. A dependency graph captures the relationship across configuration objects related to a service and are specific to the service. In one example approach, a dependency graph specific to each service type is constructed each time a new service type is defined. For example, in some example approaches, as soon as the service definition is uploaded, SDE 12 constructs the dependency graph for that service from the mapper/translator before storing the dependency graph as part of the service object in service database 60. In one example approach, each dependency graph consists of a list of column values as nodes.

Figure 6:
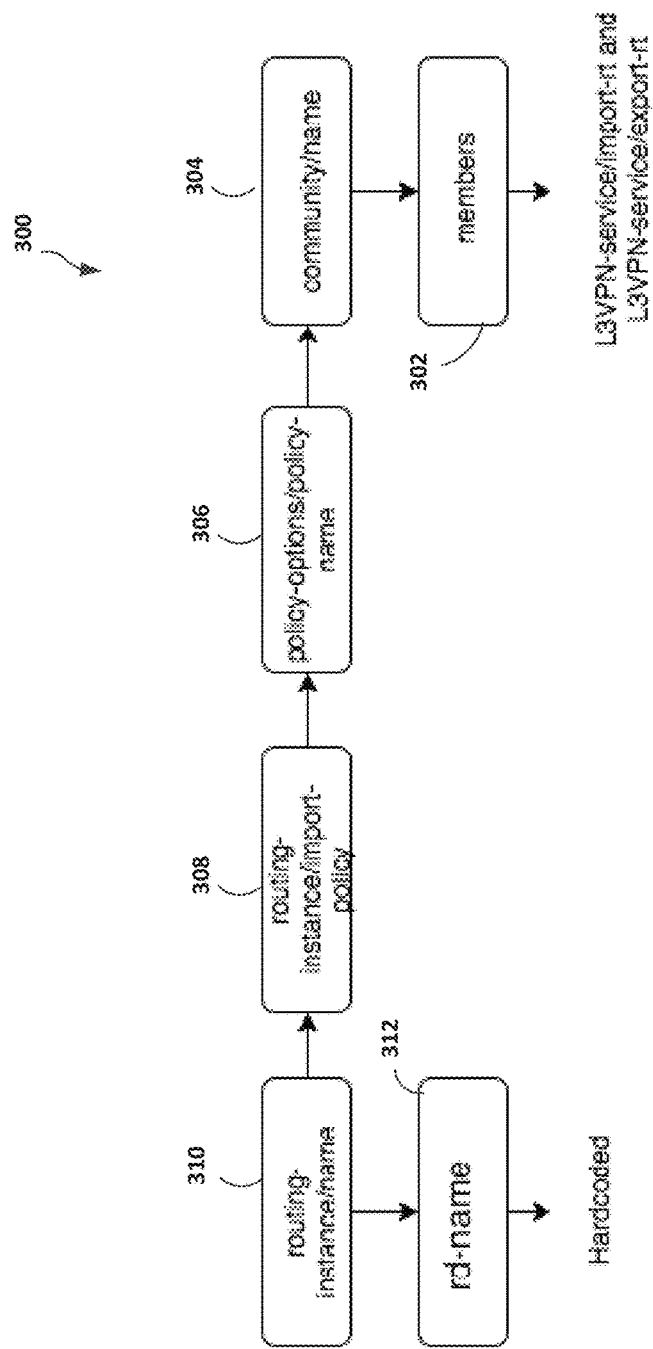
FIG. 6 is a conceptual diagram illustrating an example dependency graph for an L3-VPN service, in accordance with one or more aspects of the disclosure.

FIG. 6 is a conceptual diagram illustrating an example dependency graph for an L3-VPN service, in accordance with one or more aspects of the disclosure. In the example dependency graph of FIG. 6, members 302 are located in community list and are neighbors of community_name 304 in dependency graph 300. Community_name 304 is a neighbor of policy-options/policy-name 306. And routing-instance/import-policy 308 is a neighbor of routing-instance/import policy 310. Route distinguisher name (rd-name) 312 is also a neighbor of routing-instance/import policy 310.

FIG. 7 is a conceptual diagram illustrating an example construction of a dependency graph for the L3-VPN service, in accordance with one or more aspects of the disclosure. For example, FIG. 7 may illustrate how SDE 12 constructs the dependency graph 300 of FIG. 6. In the example shown in FIG. 7, At 1, SDE 12 locates 'members' in a community list. 'Community_name' is also part of the mapping. Members are added as neighbors of community_name in the dependency graph.

At 2, since policy-statement/term/community is a 'leafref' of community/community_name, SDE 12 adds community_name as a neighbor of policy-statement/term/community.

At 3, SDE 12 finds 'community' under 'term' list. There is one more path (policy-statement/term/term•name) found in the mapping, which has the prefix 'policy-statement/term'.

At 4, SDE 12 finds 'term-name' under the list 'policy-statement.' There is a path in the mapping with the prefix 'policy-statement', which is 'policy-statement/policy-name'.

At 5, SDE 12 notes that vrf-import and vrf-export are leafrefs of policy_name. VRF-import and VRF-export refer to Virtual Routing and Forwarding instance (VRF) routes imported and exported, respectively, by routers that are members of a L3-VPN.

At 6, SDE 12 finds vrf-import under the list 'routing-instances/instance'. There is a path ('routing-instances/instance/instance_name') in the mapping, which starts with 'routing-instances/instance'. So vrf•import is added as a neighbor to instance_name.

FIG. 8 is a conceptual diagram illustrating an example mapping template, in accordance with one or more aspects of the disclosure. In the example shown in FIG. 8, "route-targets" are defined as merge attributes for an L3-VPN configuration. The route-targets are mapped to configuration 340→policy-options 342→community 344 and members 346 or "configuration/policy-options/community/members."

To apply the mapping templates, SDE 12 retrieves a list of service keys (merge attributes) and their corresponding device configuration mappings. Then, for each service key, SDE 12:

1) gets the references of the device configuration mappings;
2) determines if this leaf is referred as a leafref from any other schema node and, if so, checks if the referrer is part of the mapping;
3) apart from the above two steps, traces back through the key xpath, one node at a time, backwards. If the current parent is a list, then SDE 12 checks if any of the device configuration xpaths map to this service definition, starting with the list xpath. (The list keys will have mappings.) If yes, then SDE 12 adds that node as a referrer.
4) find the nodes referred by the current node (SDE 12 does this recursively until node references are used); and
5) Follows the steps (1) to (4) recursively, until no referrers are found and mark the current node as root. SDE 12 then merges the dependency trees built from each service key.

Figure 9:
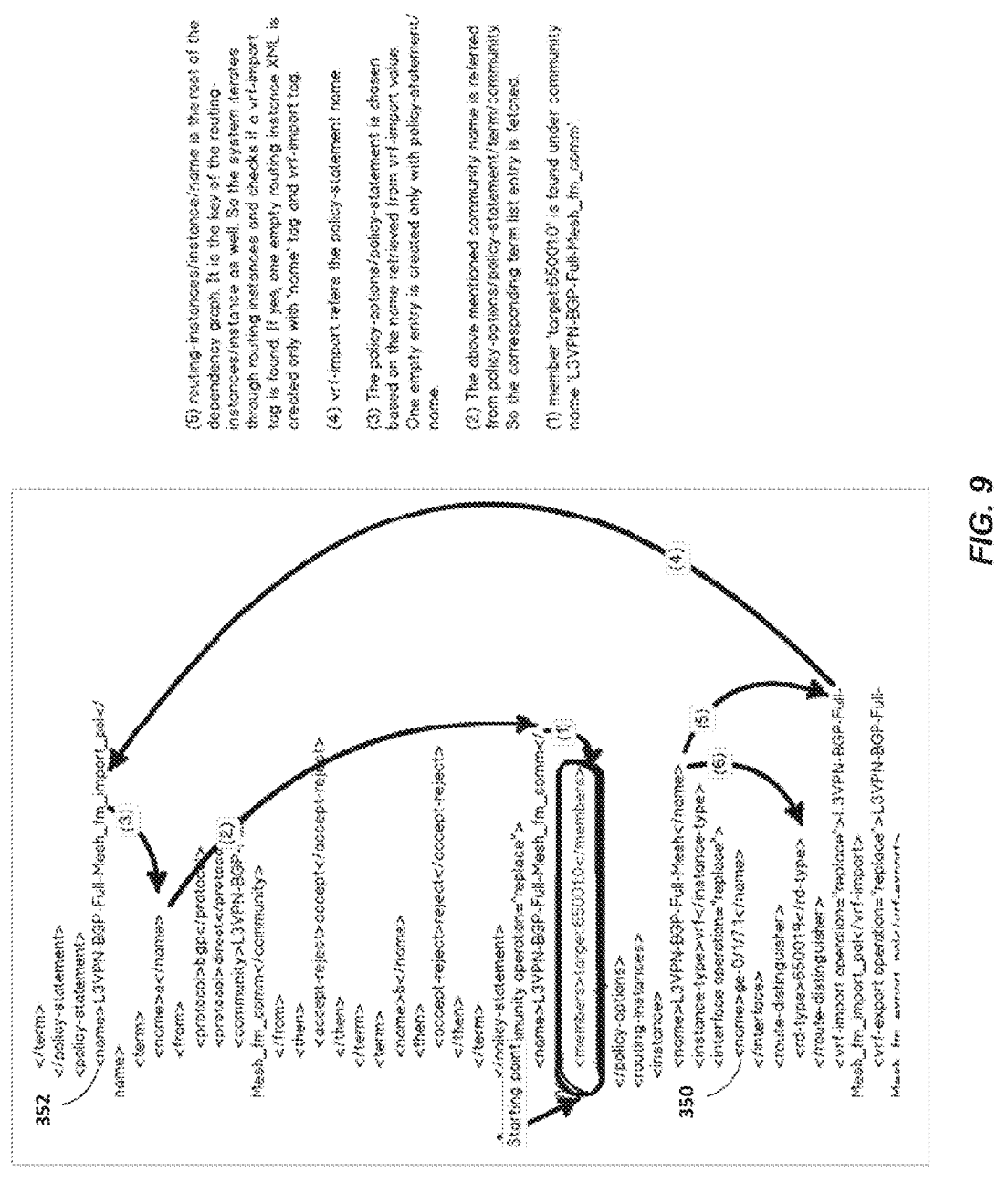

FIG. 9 is a conceptual diagram illustrating a service discovery engine creating a partial service instance using a dependency graph, in accordance with one or more aspects of the disclosure. The diagram shows one way values are filled for each entry in the dependency graph.

In the example of FIG. 9, routing-instances/instance/name 350 is the root of the dependency graph. It is the key of the routing•instances/instance as well. So SDE 12 iterates through routing instances and checks if a vrf-import tag is found. If yes, SDE 12 creates one empty routing instance XML only with 'name' tag and vrf-import tag.

Vrf-import refers to the policy-statement name 352. The policy-options/policy-statement is chosen based on the name retrieved from vrf-import value. One empty entry is created only with policy-statement/name. The above mentioned community name is referred from policy-options/policy-statement/term/community. So SDE 12 fetches the corresponding term list entry and finds member "target: 65001:0" under community name "L3VPN-BGP-Full-Mesh_fm_comm".

Once the device is managed, SDE 12 builds configuration objects, which are related to a specific service type. In one example approach, SDE 12:

a) Traverses through all the service models available in the system.

b) For each, service model, checks if the device XPATH mapped with each of its qualifier attributes is available in the device configuration.

c) If not, skips current service model. If yes, then construct or retrieve the dependency graph for this service model.

d) Traverses through the dependency graph starting from the root and gets corresponding values for each node. For each xpath in the dependency graph, a. Get the corresponding value for the path. If the value is a list key, then create an empty list item and set only the key and previously formed values, if any (details shown in FIG. 9).

e) Apply the reverse template on the created partial configuration from the above steps.

f) While applying reverse template, if any of the mandatory mappings are not found, then the failure information is logged and the service type is skipped.

g) When there is more than one service type that matches, all of the matching service types are sent for merge phase.

There may be, however, some issues with the above approach. For instance, when random names are used for some internal node keys, whose names are auto generated in the system, this may cause an issue when the same configuration is deployed to the device using the system. For example, say that the mappings defined by the user exploit the interface name and unit name to generate the filter names used by the interface. The input filter used by interface ge-0/0/1 and unit 0 will always have the name 'filter_ge-0/0/1.0' when deployed from system 10. But the existing configuration in the device has the name 'l3vpn_input_filter' instead of 'filter_ge-0/0/1.0'. One approach to this issue is shown in FIGS. 10 and 11, where FIG. 10 illustrates a default service mapping and FIG. 11 illustrates a service mapping read from a device.

Figures 10, 11:
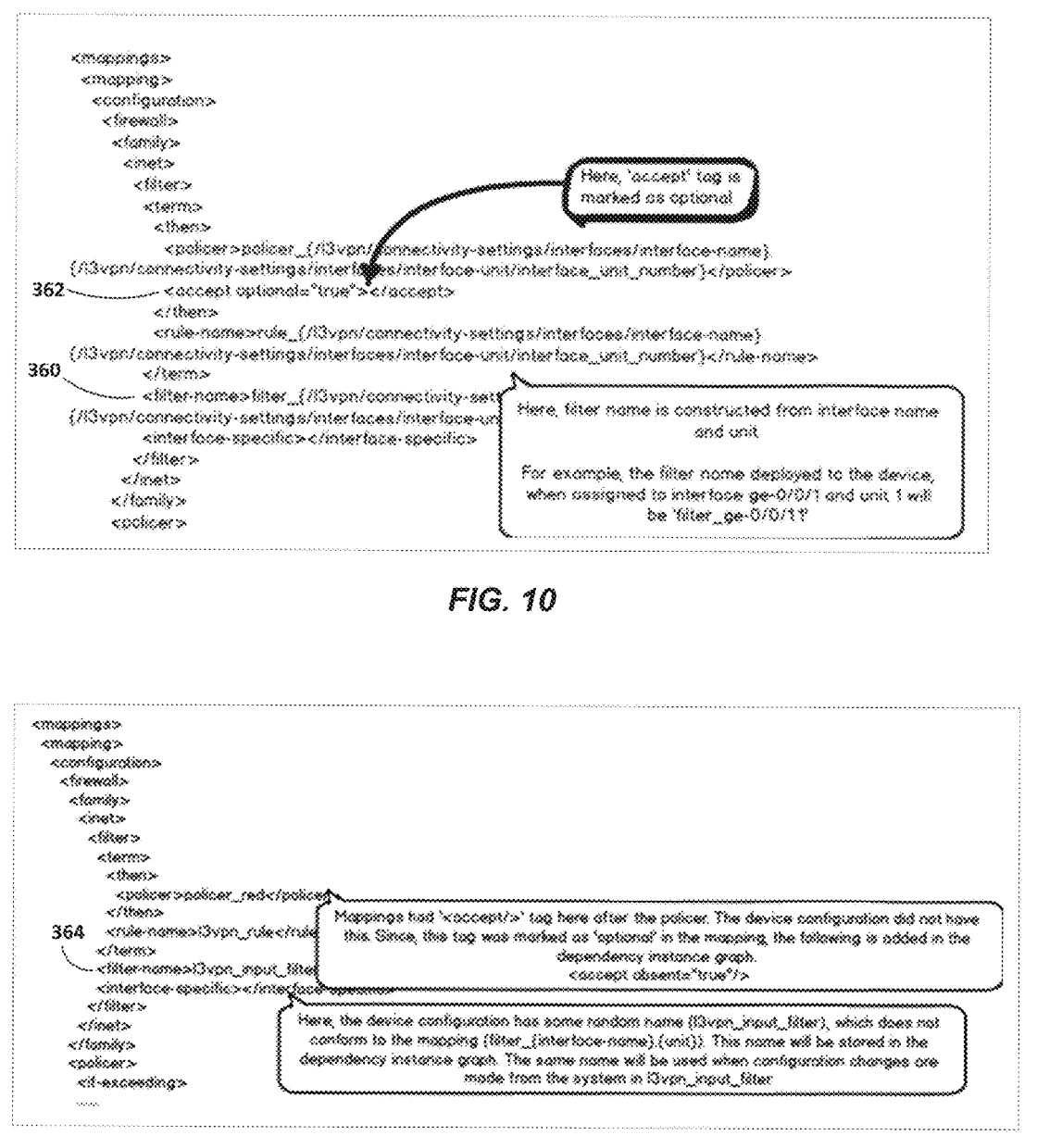

FIGS. 10 and 11 are conceptual diagrams illustrating example default service mapping and device configuration, respectively, in accordance with one or more aspects of the disclosure. FIGS. 10 and 11 illustrate the situation where SDE 12 applies a naming convention constructed from the interface name and unit but the service instance has an assigned filter name. As shown at 360, the name is generated automatically based on a rule. Here, NMS 10 constructs the filter name from interface name and unit. For example, the filter name deployed to the device, when assigned to interface ge-0/0/1 and unit 1 will be 'filter_ge-0/0/1.1'. In one example approach, NMS 10 saves the name found in the network device as part of the dependency instance graph, which is tied with the current endpoint instance and service instance.

During reverse mapping, if a hardcoded-mapping template does not match with the value present in the device, SDE 12 saves the value present in the device with all its references as an XML graph. During deployment of the configuration for this endpoint, SDE 12 applies the XML graph during forward mapping and on top of the default mappings. For example, the service mapping read from the device in FIG. 11 does not conform to naming rule 360 of FIG. 10. Instead, it has a random name 364 ('l3vpn_input_filter'). When reverse-mapping, SDE 12 stores this name in the dependency instance graph and uses that name when making configuration changes in l3vpn_input_filter.

A similar issue may occur when an optional attribute differs from the hardcoded value in mapping. FIG. 11 illustrates a case where an optional attribute ("accept") differs from the hardcoded value in mapping. In the example approach shown in FIG. 11, SDE 12 captures values associated with optional attributes as part of the dependency graph. In the example shown in FIG. 10, 'accept' tag 362 is marked as optional but the accept tag is missing in FIG. 11. Since the tag was marked as optional in the mapping, SDE 12 checks for the accept tag in the service mapping read from the device. If the SDE 12 determines the device configuration does not include an 'accept' tag, the SDE 12 adds the following in the dependency instance graph: <accept absent='true'/>.

In one example approach, for optional attributes whose values do not exist in the discovered service configuration, SDE 12 sets a 'none' value in the overridden template. In one example approach, if the tag itself is not present, then SDE 12 updates the dependency instance graph to reflect the mapping with the attribute 'absent'.

After the build phase, SDE 12 enters a merge phase. When the user defines the service using a designer such as described above, network management system 10 suggests a predicted merge strategy along with the merge attributes for the service model. After network management system 10 receives a user input confirming the predicted merge strategy, SDE 12 saves the merge strategy as part of the service model. In some examples, by default, the system has two merge strategies defined: Equator and Complex Equator.

In one example approach, service merge involves the following steps:

1) Identify if a match is found from the service database (DB) for the current partial service instance; and 2) If yes, merge the instances and save the merged instance back to the service DB.

To identify a match for a partial service, some filtering strategy is needed to qualify the partial instances of the same service. For example, all the P2P service endpoints share the same virtual chassis identifier. These merge strategies may be complex. For example, the endpoints of an L3VPN service with hub-spoke topology may not share an identifier. Instead, the hub imports all the spokes' route targets when the spokes import the hub's route target.

In some examples, by default, two merge rules are defined in Python: Equator and Complex Equator. If the 'equator' is used for a full mesh L3VPN service model, then the merge rule in the YANG configuration will look like this for a service:

sd-ext:merge-rule {
        sd-ext:equator-merge-rule;
        sd-ext:merge-attribute{
            sd-ext:ma-path "/l3vpn-service/route-target";
        }
    }

For the complex equator merge rule, in case of the hub-and-spoke L3VPN service model, the rule will look like the following.

sd-ext:merge-rule {
        sd-ext:ce-merge-rule;

```
    sd-ext:merge-attribute{
       sd-ext:ma-path "/l3vpn-service/exportedRT";
    }
    sd-ext:merge-attribute{
       sd-ext:ma-path "/l3vpn-service/importedRT";
    }
}
```

For example, if partial-service-1 has exportedRT [a] and importedRT[b, c] and partial-service-2 has exportedRT[b] and importedRT[a], then partial-service-1 and partial-service-2 will be merged. Reason is, partial-service-1's importedRT contains one of partial-service-2's exportedRTs and partial-service-1's exportedRT list contains one of partial-service-2's importedRTs.

Apart from the default merge rules, custom matchers can also be defined in, for example, Python, which can be used for comparing the services to identify which instances can be merged. In one example approach, the merge rule may look like this for a service:

```
sd-ext:merge-rule {
    sd-ext:custom-merge-rule;
    sd-ext:matcher-script    "scripts.CustomService-
       Matcher";
    sd-ext:merge-attribute{
       sd-ext:ma-path "/service/exportedRT";
    }
    sd-ext:merge-attribute{
       sd-ext:ma-path "/service/importedRT";
    }
}
```

In some approaches, these custom matchers include logic to identify whether the given two partial service instances match.

An example approach for merging partial service instances includes two steps:
1) Merge endpoints and check if service level attributes share the same value when the XPATH is mapped with more than one endpoints; and
2) Resolve external mappings.

In this example, SDE 12 merges endpoints as follows:
1) First, retrieve all the partial service instances which pass the merge rule. Then the retrieved partial service instances are grouped based on service types. If one of the service types is the same as the current service's type, then the other partial service instances are discarded. Otherwise the partial service instances are sorted in such a way that the service type created most recently, appears first.
2) Second, perform a field by field merge. For lists, the list items with the same keys are merged. Otherwise the extra item is added into the list present in the original service. If any of the fields are not found in the service instance fetched from the DB, then the system tries to merge all its contents with the current partial instance. If this partial instance does not contain some of the attributes present in the DB instance, then the DB instance is discarded. Else, after resolving the external mappings, it is checked if the service has any validation errors. If not, then it is assumed that the service instance is complete. The partial service instances of other types, which matched this instance, are discarded.

An example approach for SDE 12 resolving external mappings includes, when external mappings are present in the service templates, using a merge strategy to apply the result of these templates on the service fields. In one example approach, external mappings look like:

```
<configuration>
   <interface>
      <name type="external" and condition=
         "l3vpn-service/endpoints/neighbor/ip-
            address= . . . /CE/device-ip">
         {l3vpn-service/endpoints/neighbor/if-name}
      </name>
   </interface>
</configuration>
```

During service discovery, after parsing is done, SDE 12 may check and determine that there are disjoint dependency graphs. If so, SDE 12 retrieves the remaining xpaths, which are yet to be mapped to service instance, and sends them as XML. In the case of BGP configuration, for example, SDE 12 stores the following XML along with the partial service instance in partial service database 62, for further stitching.

```
<configuration>
   <interface>
      <name>ge-0/0/1</name>
      <unit>
         <name>12</name>
         <family>inet</family>
         <address>1.2.3.4</address>
      </unit>
   </interface>
   <interface>
      <name>ge-0/0/2</name>
   </interface>
   <interface>
      <name>ge-0/0/3</name>
   </interface>
</configuration>
```

During merge phase, SDE 12 retrieves the above XML and the external mappings as mentioned above and determines whether there are any partial L3VPN service instances with the given qualifiers. If a match is found, then SDE 12 searches for the endpoint with the given condition (in this case, it is 'l3vpn-service/endpoints/neighbor/ip-address=configuration/interface/unit/family/address') and sets 'l3vpn-service/endpoints/peer/if-name' with the interface name found in current device.

In one example approach, each service is characterized by a service model and a mapper with device schema, where the service model has a merge attribute, which is mapped to an attribute in the device schema. In some such approaches, there can be multiple service models mapped to the same device schema. In one approach, SDE 12 merges two or more partial service instances by identifying those partial service instances with the same value stored in the merge attribute.

In one example approach, each service is characterized by a service model having a plurality of attributes, including a merge attribute. In such an approach, SDE 12 merges two or more partial service instances by identifying those partial service instances having each of the plurality of attributes in the service model.

In one example approach, each service is characterized by a service model and a mapper with device schema, where the service model has a merge attribute, which is mapped to an attribute in the device schema. The service model also includes a plurality of attributes in addition to the merge attribute. In such an approach, SDE 12 merges two or more partial service instances by identifying those partial service instances having both each of the plurality of attributes in the service model and the same value stored in the merge attribute.

Figure 12:
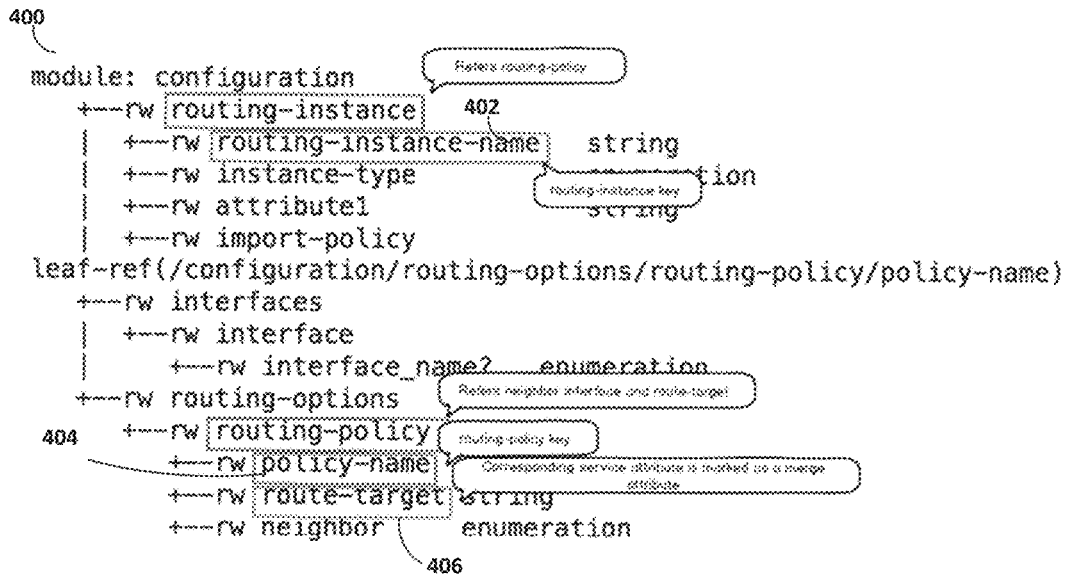
FIGS. 12 and 13 are conceptual diagrams illustrating example a sample device schema in YANG format and a sample service model in YANG format, respectively, in accordance with one or more aspects of the disclosure.
Figure 13:
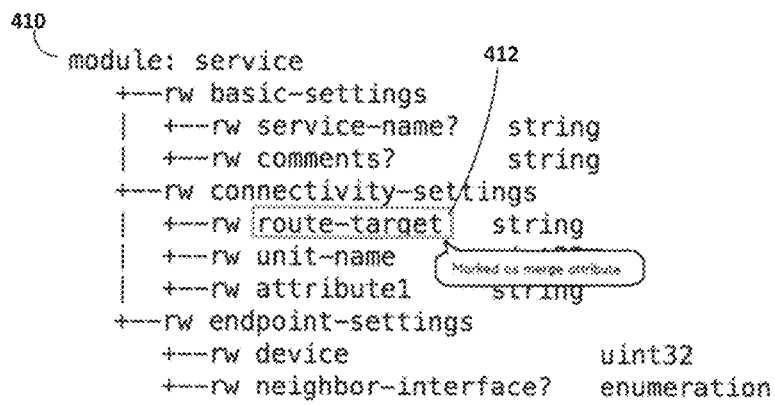

A simple routing example will be discussed next. FIGS. 12 and 13 are conceptual diagrams illustrating example a sample device schema in YANG format and a sample service model in YANG format, respectively, in accordance with one or more aspects of the disclosure. Service model 410 describes a service of type 'service'. In the device schema of FIG. 12, routing-instance-name 402 is a routing-instance key while policy-name 404 is a routing-policy key. Route-target 406 has a corresponding service attribute in FIG. 13 (route-target 412) and is, therefore, marked as a merge attribute.

In one example approach, as noted above, in order to perform service discovery, SDE 12 uses the following elements:

1) A device model.
2) A service model with a merge strategy. During merge phase, SDE 12 uses the merge strategy to stitch the configurations found in the device into a service. While defining the service, in some example approaches, NMS 10 suggests possible merge strategies to the user.
3) When a service model is created, the structure of the service model is read and understood by NMS 10 in the form of a dependency graph. The dependency graph is built based on leafrefs and containment hierarchy in the device model, and mappings and merge attributes defined in the service model. In some approaches, the dependency graph is stored with the service model in model data storage 40.
4) When a device is discovered, the configurations in the device are split and stitched into multiple partial service instances, by using the appropriate dependency graphs. This is called build phase.
5) Then, by using the merge strategy, the partial service instances found on the devices are merged (Merge phase).

In one example approach, the following YANG extension is used to define a merge rule for service model 410.

```
sd-ext:merge-rule {
    sd-ext:equator-merge-rule; ←Says that the route-tar-
        gets will be simply compared among partial service
        instances
    sd-ext:merge-attribute{
        sd-ext:ma-path     "/service/connectivity-settings/
            route-target";
    }
}
```

In simple terms, as noted above, when a device is discovered and service discovery is triggered, service discovery engine 12 will try to find if there are any service instances with the route-target found in current device. If found, SDE 12 will merge the current partial service instance with the existing one service instance.

SDE 12 uses schema mappings for translating service XML into device XML. To make things simple, the schema mappings corresponding to service model 410 and its corresponding device configuration information are shown below as key-value pairs:

/configuration/routing-options/routing-policy/routing-policy/neighbor→/service/endpoint-settings/neighbor-interface
/configuration/routing-options/routing-policy/routing-policy/route-target→/service/connectivity-settings/route-target
/configuration/routing-instance/attribute1→/service/connectivity-settings/attribute1

Dependencies
/configuration/routing-options/routing-policy/routing-policy/policy-name→'policy_'+
/configuration/routing-options/routing-policy/routing-policy/route-target
/configuration/routing-instance/import-policy→/configuration/routing-options/routing-policy/routing-policy/policy-name
/configuration/routing-instance/routing-instance-name→'ri_'+/configuration/routing-options/routing-policy/routing-policy/route-target
Hardcoded Mappings
/configuration/routing-instance/instance-type→'vrf'

Figure 14:
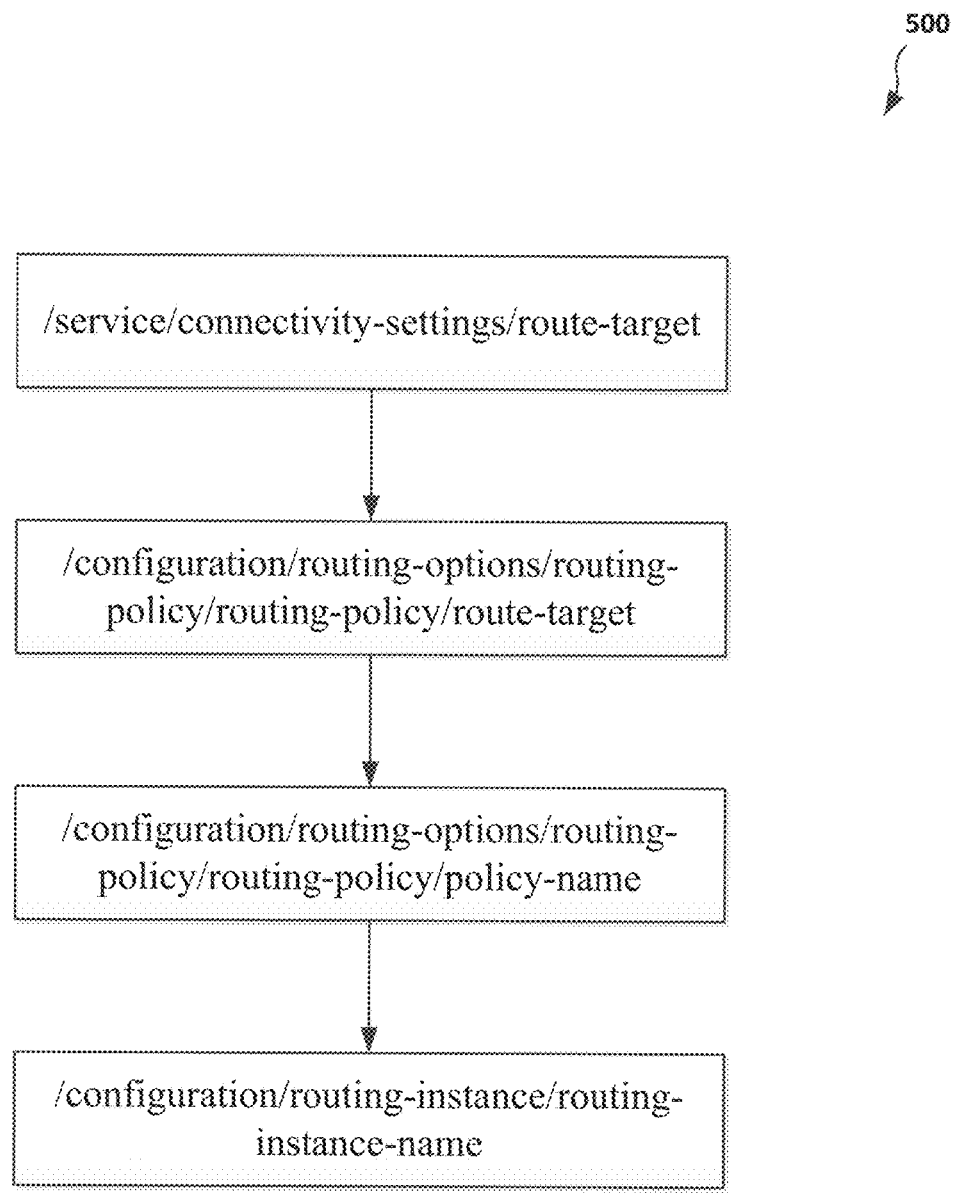
FIG. 14 is a block diagram illustrating an example dependency graph, in accordance with one or more aspects of the disclosure.

FIG. 14 is a block diagram illustrating an example dependency graph, in accordance with one or more aspects of the disclosure. SDE 12 constructs dependency graph 500 from the leafrefs and the containment hierarchy in device schema 400.

Figure 15B:
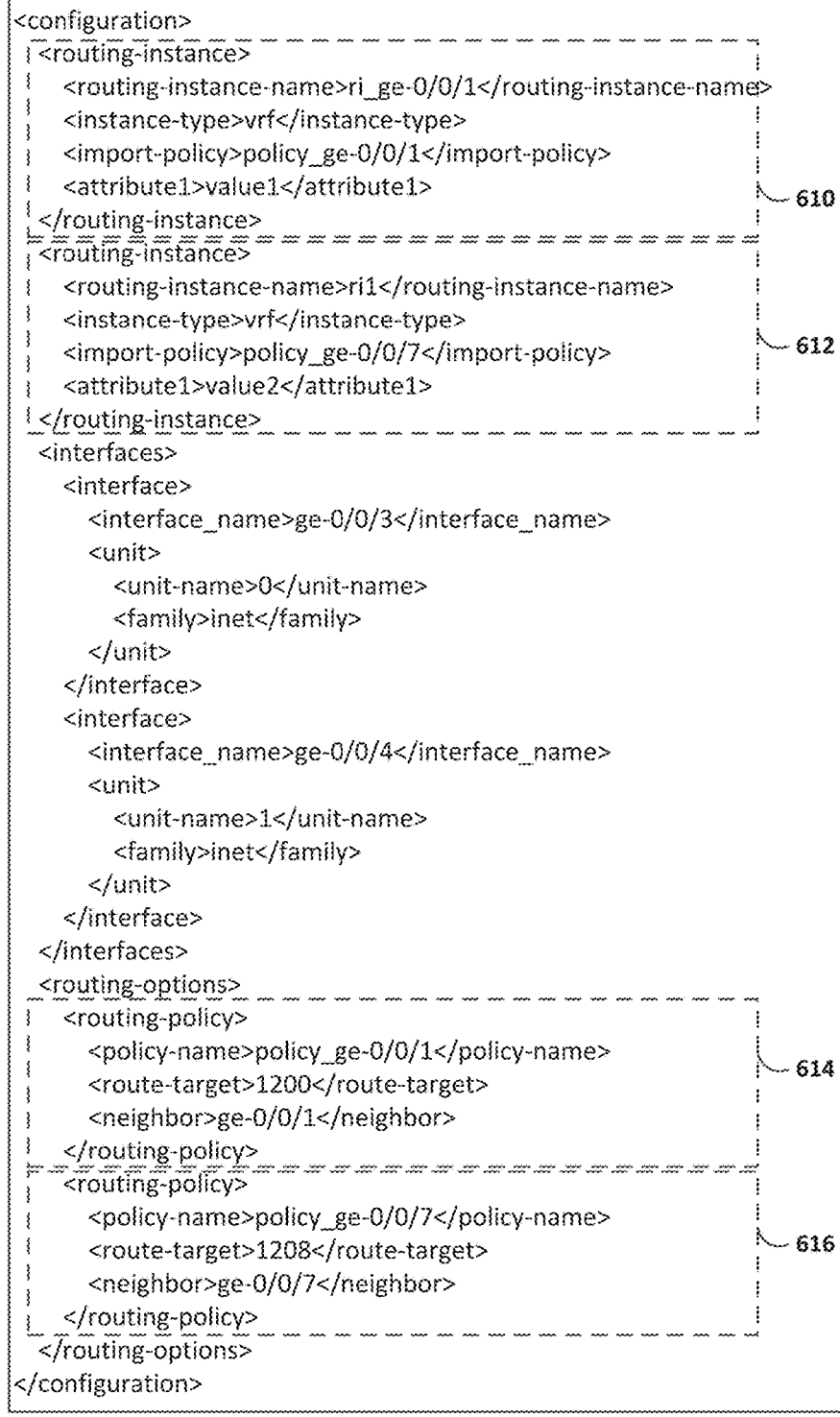

FIGS. 15A and 15B illustrate example device configurations for two routing devices, in accordance with one or more aspects of the disclosure. The two devices are referred to here as "device 1" and "device 2." These may correspond to routing devices within system 2 of FIG. 1, such as gateways 8A, 8B, or routing elements 5H and 5B, for example. In the example shown in FIG. 15A, routing-instance 600 is related to routing-policy 604 while routing-instance 602 is related to routing-policy 606. In the example shown in FIG. 15B, routing-instance 610 is related to routing-policy 614 while routing-instance 612 is related to routing-policy 616. As shown in FIG. 15A, the configuration for device 1 is:

```
<configuration>
    <routing-instance>
        <routing-instance-name>ri1</routing-instance-name>
        <instance-type>vrf</instance-type>
        <import-policy>import-policy-1</import-policy>
        <attribute1>value1</attribute1>
    </routing-instance>
    <routing-instance>
        <routing-instance-name>ri2</routing-instance-name>
        <interface>ge-1/2/3</interface>
    </routing-instance>
    <interfaces>
        <interface>
            <interface_name>ge-0/0/1</interface_name>
            <unit>
                <unit-name>0</unit-name>
                <family>inet</family>
            </unit>
        </interface>
        <interface>
            <interface_name>ge-0/0/2</interface_name>
            <unit>
                <unit-name>1</unit-name>
                <family>inet</family>
            </unit>
        </interface>
    </interfaces>
    <routing-options>
        <routing-policy>
            <policy-name>import-policy-1</policy-name>
            <route-target>1200</route-target>
            <neighbor>ge-0/0/3</neighbor>
        </routing-policy>
        <routing-policy>
            <policy-name>import-policy-2</policy-name>
            <route-target>1204</route-target>
```

```
            <neighbor>ge-0/0/5</neighbor>
         </routing-policy>
      </routing-options>
</configuration>
```
while, as shown in FIG. 15B, the configuration for device 2 is:
```
<configuration>
   <routing-instance>
      <routing-instance-name>ri_ge-0/0/1</routing-in-
         stance-name>
      <instance-type>vrf</instance-type>
      <import-policy>policy_ge-0/0/1</import-policy>
      <attribute1>value1</attribute1>
   </routing-instance>
   <routing-instance>
      <routing-instance-name>ri1</routing-instance-name>
      <instance-type>vrf</instance-type>
      <import-policy>policy_ge-0/0/7</import-policy>
      <attribute1>value2</attribute1>
   </routing-instance>
   <interfaces>
      <interface>
         <interface_name>ge-0/0/3</interface_name>
         <unit>
            <unit-name>0</unit-name>
            <family>inet</family>
         </unit>
      </interface>
      <interface>
         <interface_name>ge-0/0/4</interface_name>
         <unit>
            <unit-name>1</unit-name>
            <family>inet</family>
         </unit>
      </interface>
   </interfaces>
   <routing-options>
      <routing-policy>
         <policy-name>policy_ge-0/0/1</policy-name>
         <route-target>1200</route-target>
         <neighbor>ge-0/0/1</neighbor>
      </routing-policy>
      <routing-policy>
         <policy-name>policy_ge-0/0/7</policy-name>
         <route-target>1208</route-target>
         <neighbor>ge-0/0/7</neighbor>
      </routing-policy>
   </routing-options>
</configuration>
```

FIGS. 16-19 illustrate example partial service instances, in accordance with one or more aspects of the disclosure. Service discovery proceeds as shown in FIGS. 16-20B. In the first step, NMS 10 discovers device 1. Device 1 and device 2 in this example may correspond to routing devices within system 2 of FIG. 1, such as gateways 8A, 8B, or routing elements 5H and 5B, for example. SDE 12 identifies the merge attributes (route-targets 1200 and 1204 in this case) and, as shown in FIG. 16, creates service instances for them. The service instances for the first device are shown as service instances 700 and 702 in FIG. 16. Each service instance 700 and 702 includes a route-target 710 and a neighbor interface 712. Service instances 700 and 702 for route-targets 1200 and 1204, respectively, of the first device are recreated below:

```
<service> (702)
   <basic-settings>
      <service-name>service_1200</service-name>
   </basic-settings>
   <connectivity-settings>
      <route-target>1200</route-target>
   </connectivity-settings>
   <endpoint-settings>
      <device>1<device>
      <neighbor-interface>ge-0/0/3</neighbor-interface>
   </endpoint-settings>
</service>
<service> (704)
   <basic-settings>
      <service-name>service_1204</service-name>
   </basic-settings>
   <connectivity-settings>
      <route-target>1204</route-target>
   </connectivity-settings>
   <endpoint-settings>
      <device>1<device>
      <neighbor-interface>ge-0/0/5</neighbor-interface>
   </endpoint-settings>
</service>
```

As can be seen with respect to FIG. 15A, routing policy names 'import-policy-1' and 'import-policy-2' do not match the hardcoded mapping value, which is 'policy_'+/configuration/routing-options/routing-policy/routing-policy/route-target (or 'policy_1200' and 'policy_1204', respectively). In response to determining that the routing policy names do not match the hardcoded mapping value, SDE 12 creates an overridden mapping for policy-name. SDE 12 will apply the overridden mapping only for these service instances, during subsequent service deployments to device 1.

In the second step for device 1, SDE 12 traces through the corresponding dependency graph. Using the dependency graph, the following details are identified: 1) routing-policy with policy-name 'import-policy-1' is referred by routing-instance with routing-instance-name 'ri1'; and 2) 'attribute1' is part of ri1, and is mapped to/service/connectivity-settings/attribute1. Using the above detail, the value of attribute1 720 is set to 'value1' in service instance 700 of FIG. 17, as shown below:

```
<service>
   <basic-settings> (702)
      <service-name>service_1200</service-name>
   </basic-settings>
   <connectivity-settings>
      <route-target>1200</route-target>
      <attribute1>value1</attribute1>
   </connectivity-settings>
   <endpoint-settings>
      <device>1<device>
      <neighbor-interface>ge-0/0/3</neighbor-interface>
   </endpoint-settings>
</service>
<service>
   <basic-settings> (704)
      <service-name>service_1204</service-name>
   </basic-settings>
   <connectivity-settings>
      <route-target>1204</route-target>
   </connectivity-settings>
   <endpoint-settings>
      <device>1<device>
      <neighbor-interface>ge-0/0/5</neighbor-interface>
   </endpoint-settings>
</service>
```

Meanwhile, mandatory attribute 'attribute1' is not found in partial service instance 704, so partial service instance 704 is not included as a merge candidate for this service type.

Next, NMS 10 discovers device 2. In the first step for device 2, SDE 12 identifies the merge attributes (route-targets 1200 and 1208 in this case) and, as shown in FIG. 18, creates service instances for them. The service instances for the second device are shown as service instances 800 and 802 in FIG. 18. Each service instance 800 and 802 includes a route-target 810 and a neighbor interface 812.

```
<service> (800)
   <basic-settings>
      <service-name>service_1200</service-name>
   </basic-settings>
   <connectivity-settings>
      <route-target>1200</route-target>
   </connectivity-settings>
   <endpoint-settings>
      <device>1<device>
      <neighbor-interface>ge-0/0/3</neighbor-interface>
   </endpoint-settings>
</service>
<service> (802)
   <basic-settings>
      <service-name>service_1208</service-name>
   </basic-settings>
   <connectivity-settings>
      <route-target>1208</route-target>
   </connectivity-settings>
   <endpoint-settings>
      <device>2<device>
      <neighbor-interface>ge-0/0/7</neighbor-interface>
   </endpoint-settings>
</service>
```

As can be seen with respect to FIG. 15B, routing policy names 'policy_ge-0/0/1' and 'policy_ge-0/0/7' do not match the hardcoded mapping value, which is 'policy_'+/configuration/routing-options/routing-policy/routing-policy/route-target (or 'policy_1200' and 'policy_1208', respectively). In response to determining that the routing policy names do not match the hardcoded mapping value, SDE 12 creates an overridden mapping for policy-name. SDE 12 will apply the overridden mapping only for these service instances, during subsequent service deployments to device 2.

Figure 19:

In the second step for device 2, SDE 12 traces through the corresponding dependency graph. Using the dependency graph, the following details are identified: 1) a routing-policy with policy-name 'policy_ge-/0/1' is referred by routing-instance with routing-instance-name 'ri_ge-/0/1' in service instance 800; and 2) 'attribute1' is part of ri_ge-0/0/1, and is mapped to /service/connectivity-settings/attribute1. Similarly, 1) a routing-policy with policy-name 'policy_ge-0/0/7' is referred by routing-instance with routing-instance-name 'ri1' in service instance 800; and 2) 'attribute1' is part of ri1, and is mapped to/service/connectivity-settings/attribute1. Using the above detail, as can be seen in FIG. 19, the value of attribute1 820 is set to 'value1' in service instance 800 while the value of attribute1 820 is set to 'value2' in service instance 802, as shown below:

```
<service>
   <basic-settings>
      <service-name>service_1200</service-name>
   </basic-settings>
   <connectivity-settings>
      <route-target>1200</route-target>
      <attribute1>value1</attribute1>
   </connectivity-settings>
   <endpoint-settings>
      <device>2<device>
      <neighbor-interface>ge-0/0/1</neighbor-interface>
   </endpoint-settings>
</service>
<service>
   <basic-settings>
      <service-name>service_1208</service-name>
   </basic-settings>
   <connectivity-settings>
      <route-target>1208</route-target>
      <attribute1>value2</attribute1>
   </connectivity-settings>
   <endpoint-settings>
      <device>2<device>
      <neighbor-interface>ge-0/0/7</neighbor-interface>
   </endpoint-settings>
</service>
```

FIG. 20A illustrates an example service instance, in accordance with one or more aspects of the disclosure. FIG. 20B illustrates an example partial service instance, in accordance with one or more aspects of the disclosure. In the example shown in FIG. 20A, SDE 12 merged the two partial service instances with route-target 1200 (partial service instance 700 and partial service instance 800) into a single service instance 900. Merged service instance 900 now includes two endpoint-settings: endpoint-settings 910 from partial service instance 700 and endpoint settings 912 from partial service instance 800. SDE 12 then saves service instance 900 as a service object to service database 60.

```
<service>
   <basic-settings>
      <service-name>service_1200</service-name>
   </basic-settings>
   <connectivity-settings>
      <route-target>1200</route-target>
      <attribute1>value1</attribute1>
   </connectivity-settings>
   <endpoint-settings>{from partial service instance 700}
      <device>1<device>
      <neighbor-interface>ge-0/0/3</neighbor-interface>
   </endpoint-settings>
   <endpoint-settings>{from partial service instance 800}
      <device>2<device>
      <neighbor-interface>ge-0/0/1</neighbor-interface>
   </endpoint-settings>
</service>
```

In the example shown in FIG. 20B, the service instance (based on partial service instance 802) has only one endpoint.

```
<service>
   <basic-settings>
      <service-name>service_1208</service-name>
      <attribute1>value2</attribute1>
   </basic-settings>
   <connectivity-settings>
      <route-target>1208</route-target>
   </connectivity-settings>
   <endpoint-settings>
      <device>2<device>
      <neighbor-interface>ge-0/0/7</neighbor-interface>
   </endpoint-settings>
</service>
```

Assume that the endpoint-settings list mandates that there should at least two endpoints for this service. Then SDE 12 saves partial service instance 902 in partial service database 62 to wait for another partial service instance with which to merge. When SDE 12 discovers a partial service instance that matches partial service instance 902, the two are merged and the resulting service instance stored as a service object in service database 60.

A network management system that discovers existing service instances running in a network has been described. As described, in various examples the network management system discovers existing configuration services running in the network by requesting configuration information from network devices running in the network, constructing partial service instances representing the services executing on each network device, merging partial service instances associated with a particular service and promoting the merged partial service instance as a service instance associated with one or more network devices. In one example, a service discovery engine in the network management system executes a build phase in which configuration information read from the network devices is used to build partial service instances related to specific service types. The service discovery engine then links all the attributes that are related to a specific instance using, for example, a dependency graph constructed from the service model and mapper. Once the partial service instances associated with a service are discovered, the service discovery engine merges the partial service instances and promotes the merged partial service instances as a service.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
   fetching, by a network management system and from a first network device, configuration data associated with a service executing on the first network device;
   in response to determining that the service extends across multiple network devices, constructing, by the network management system and based on the configuration data, a first partial service instance associated with the service executing on the first network device;
   merging, by the network management system, a plurality of partial service instances to form a merged partial service instance, the plurality of partial service instances including the first partial service instance and a second partial service instance associated with the service executing on a different network device; and
   promoting the merged partial service instance as a service instance.

2. The method of claim 1, wherein promoting the merged partial service instance as a service instance includes storing the service instance as a service object in the service database, wherein the service object includes service-level configuration information associated with the service instance.

3. The method of claim 1, wherein each service is characterized by a service model and by a mapper with a device schema having one or more attributes, the service model having a merge attribute mapped on one of the device schema attributes, wherein the merge attribute has a value, and
   wherein merging includes selecting, as the second partial instance, a candidate partial service instance having a value of the merge attribute that matches the value of the merge attribute for the first partial service instance.

4. The method of claim 1, wherein each service is characterized by a service model having a merge attribute and by a mapper with a device schema having a first attribute and a second attribute, the merge attribute mapped on the first and second attributes, wherein the merge attribute has a value, and wherein each of the first and second device schema attributes include one or more values;
   wherein merging includes selecting a candidate partial service instance as the second partial service instance, wherein one of the candidate partial service instance's second attributes has a value that matches one of the first attribute values of the first partial service instance and wherein one of the candidate partial service instance's first attributes has a value that matches one of the second attribute values of the first partial service instance.

5. The method of claim 1, wherein the service is characterized by a service model having a plurality of attributes, and
   wherein merging includes selecting, as the second partial service instance, a candidate partial service instance having each of the plurality of attributes in the service model.

6. The method of claim 1, wherein each service is characterized by a service model and by a mapper with a device schema having one or more attributes, the service model having a merge attribute mapped on one of the device schema attributes, wherein the merge attribute has a value, and wherein merging includes selecting, as the second partial service instance, a candidate partial service instance having each of the plurality of attributes in the service model and having a value of the merge attribute that matches the value of the merge attribute for the first partial service instance.

7. The method of claim 1, wherein the plurality of partial service instances further includes a third partial service instance, the third partial service instance associated with the service executing on a third network device.

8. The method of claim 7, wherein each service is characterized by a service model and by a mapper with a device schema having one or more attributes, the service model having a merge attribute mapped on one of the device schema attributes, wherein the merge attribute has a value, and wherein merging includes identifying the second and the third partial service instances based on values of the merge attributes of the first, second and third partial service instances.

9. The method of claim 7, wherein each service is characterized by a service model and by a mapper with a device schema having one or more attributes, the service model having a merge attribute mapped on one of the device schema attributes, wherein the merge attribute has a value, and wherein merging includes:
selecting, as the second partial service instance and from the plurality of partial service instances, a first candidate partial service instance having each of the plurality of attributes in the service model and having a value of the merge attribute that matches the value of the merge attribute for the first partial service instance; and
selecting, as the third partial service instance and from the plurality of partial service instances, a second candidate partial service instance having each of the plurality of attributes in the service model and having a value of the merge attribute that matches the value of the merge attribute for the first partial service instance.

10. The method of claim 1, wherein each service is characterized by a service model, and wherein promoting the merged partial service instance as a service instance includes:
determining, from the service model, a minimum number of partial service instances required for the merged partial service instance to be promoted as a service instance;
if the merged partial service instance was formed from less than the minimum number of partial service instances required, storing the merged partial service instance in a partial service instance database; and
if the merged partial service instance was formed from at least the minimum number of partial service instances required, storing service-level configuration information associated with the service to a service database.

11. The method of claim 1, wherein each service is characterized by a service model and by a mapper with a device schema having one or more attributes, the service model having a merge attribute mapped on one of the device schema attributes, wherein the merge attribute has a value, and wherein merging includes:
identifying, by the network management system, the second partial service instance based on the value of the merge attribute of the first and second partial service instances; and
merging the first and second partial service instances based on the merge strategy.

12. The method of claim 1, wherein each service is characterized by a service model and by a mapper with a device schema having one or more attributes, the service model having a merge attribute mapped on one of the device schema attributes, wherein the merge attribute has a value, and wherein merging includes:
selecting, as the second partial service instance, a candidate partial service instance having each of the plurality of attributes in the service model and having a value of the merge attribute that matches the value of the merge attribute for the first partial service instance; and
merging the first and second partial service instances based on the merge strategy.

13. The method of claim 1, wherein the second partial service instance is a merged partial service instance retrieved from a partial service database.

14. The method of claim 1, further comprising:
suggesting, by a network management system, one or more merge strategies for a service model; and
receiving an input selecting one of the merge strategies; and
adding the selected merge strategy to the service model.

15. The method of claim 1, wherein each service is characterized by a service model and by a mapper with a device schema having one or more attributes, the service model having a merge attribute mapped on one of the device schema attributes, wherein a second attribute of the plurality of attributes has an expected value, and
wherein constructing includes:
comparing a value of the second attribute received from the first network device to the expected value of the second attribute; and
if the value received from the first network device does not match the expected value, storing the value of the second attribute received from the first network device in memory to be used as the value of the second attribute when configuring the service on the first network device.

16. The method of claim 1, wherein each service is characterized by a service model and by a mapper with a device schema having one or more attributes, the service model having a merge attribute mapped on one of the device schema attributes, wherein the merge attribute has a value, wherein merging includes:
retrieving a candidate partial service instance from a partial service database;
if the candidate partial service instance has a value of the merge attribute that matches the value of the merge attribute for the first partial service instance, selecting the candidate partial service instance as the second partial service instance, and
wherein promoting includes:
validating the merged partial service instance as a service;

if the merged partial service instance is validated as a service, storing the merged partial service instance to the service database; and if the merged partial service instance is not validated as a service, storing the merged partial service instance to the partial service database.

17. The method of claim 1, wherein each service is characterized by a service model and by a mapper with a device schema having one or more attributes, the service model having a merge strategy and a merge attribute mapped on one of the device schema attributes, wherein the merge attribute has a value, wherein merging includes:
retrieving a candidate partial service instance from a partial service database;
if the candidate partial service instance has a value of the merge attribute that matches the value of the merge attribute for the first partial service instance, selecting the candidate partial service instance as the second partial service instance; and
merging, based on the external mappings and the merge strategy, the first and second partial service instances, and wherein promoting includes:
validating the merged partial service instance as a service;
if the merged partial service instance is validated as a service, storing the merged partial service instance to the service database; and
if the merged partial service instance is not validated as a service, storing the merged partial service instance to the partial service database.

18. The method of claim 1, wherein each service is characterized by a service model and by a mapper with a device schema having one or more attributes, the service model having a merge strategy, one or more external mappings and a merge attribute mapped on one of the device schema attributes, wherein the merge attribute has a value, wherein merging includes:
retrieving a candidate partial service instance from a partial service database;
if the candidate partial service instance has a value of the merge attribute that matches the value of the merge attribute for the first partial service instance, selecting the candidate partial service instance as the second partial service instance; and
merging, based on the external mappings and the merge strategy, the first and second partial service instances, and wherein promoting includes:
checking the merged partial service instance for validation errors;
if there are no validation errors, storing the merged partial service instance as a service object to the service database; and
if there are validation errors, storing the merged partial service instance to the partial service database.

19. A service management system, comprising:
a service database;
one or more service handlers connected to the service database;
a processor; and
at least one non-transitory computer-readable storage medium storing instructions that are executable by the processor to:

fetch, from a first network device, configuration data associated with a service executing on the first network device;
in response to determining that the service extends across multiple network devices, construct, based on the configuration data, a first partial service instance associated with the service executing on the first network device;
merge a plurality of partial service instances to form a merged partial service instance, the plurality of partial service instances including the first partial service instance and a second partial service instance associated with the service executing on a different network device; and
promote the merged partial service instance as a service instance.

20. The service management system of claim 19, wherein the instructions that are executable by the processor to promote the merged partial service instance as a service instance include instructions that are executable by the processor to store the merged partial service instance as a service object in the service database, wherein the service object includes service-level configuration information associated with the service instance.

21. The service management system of claim 19, wherein each service is characterized by a service model and by a mapper with a device schema having one or more attributes, the service model having a merge attribute mapped on one of the device schema attributes, wherein the merge attribute has a value, and wherein the instructions that are executable by the processor to merge a plurality of partial service instances to form a merged partial service instance include instructions that are executable by the processor to select, as the second partial instance, a candidate partial service instance having a value of the merge attribute that matches the value of the merge attribute for the first partial service instance.

22. The service management system of claim 19, wherein each service is characterized by a service model and by a mapper with a device schema having a first attribute and a second attribute, the merge attribute mapped on the first and second attributes, wherein the merge attribute has a value, and wherein each of the first and second device schema attributes include one or more values, and wherein the instructions that are executable by the processor to merge a plurality of partial service instances to form a merged partial service instance include instructions that are executable by the processor to select a candidate partial service instance as the second partial service instance, wherein one of the candidate partial service instance's second attributes has a value that matches one of the first attribute values of the first partial service instance and wherein one of the candidate partial service instance's first attributes has a value that matches one of the second attribute values of the first partial service instance.

23. The service management system of claim 19, wherein each service is characterized by a service model and by a mapper with a device schema having a first attribute and a second attribute, the merge attribute mapped on the first and second attributes, wherein the merge attribute has a value, and wherein each of the first and second device schema attributes include one or more values, and wherein the instructions that are executable by the processor to merge a plurality of partial service instances to form a merged partial service instance include instructions that are executable by the processor to select, as the second partial service instance, a candidate partial service instance having each of the plurality of attributes in the service model.

24. The service management system of claim 19, wherein each service is characterized by a service model, and wherein the instructions that are executable by the processor to promote the merged partial service instance as a service instance include instructions that are executable by the processor to:

determine, from the service model, a minimum number of partial service instances required for the merged partial service instance to be promoted as a service instance;

if the merged partial service instance was formed from less than the minimum number of partial service instances required, store the merged partial service instance in a partial service instance database; and if the merged partial service instance was formed from at least the minimum number of partial service instances required, store service-level configuration information associated with the service to a service database.

25. The service management system of claim 19, wherein each service is characterized by a service model and by a mapper with a device schema having one or more attributes, the service model having a merge attribute mapped on one of the device schema attributes, wherein the merge attribute has a value, and wherein the instructions that are executable by the processor to merge a plurality of partial service instances to form a merged partial service instance include instructions that are executable by the processor to:

identify the second partial service instance based on the value of the merge attribute of the first and second partial service instances; and merge the first and second partial service instances based on the merge strategy.

26. The service management system of claim 19, wherein each service is characterized by a service model and by a mapper with a device schema having one or more attributes, the service model having a merge attribute mapped on one of the device schema attributes, wherein the merge attribute has a value, and wherein the instructions that are executable by the processor to merge a plurality of partial service instances to form a merged partial service instance include instructions that are executable by the processor to:

select, as the second partial service instance, a candidate partial service instance having each of the plurality of attributes in the service model and having a value of the merge attribute that matches the value of the merge attribute for the first partial service instance; and merge the first and second partial service instances based on the merge strategy.

27. The service management system of claim 19, wherein the instructions further comprise instructions that are executable by the processor to:

suggest one or more merge strategies for a service model; and receive an input selecting one of the merge strategies; and add the selected merge strategy to the service model.

28. The service management system of claim 19, wherein each service is characterized by a service model and by a mapper with a device schema having one or more attributes, the service model having a merge attribute mapped on one of the device schema attributes, wherein a second attribute of the plurality of attributes has an expected value, and wherein the instructions that are executable by the processor to construct a first partial service instance includes instructions that are executable by the processor to:

compare a value of the second attribute received from the first network device to the expected value of the second attribute; and if the value received from the first network device does not match the expected value, store the value of the second attribute received from the first network device in memory to be used as the value of the second attribute when configuring the service on the first network device.

29. A non-transitory computer-readable storage medium encoded with instructions that, when executed, cause at least one processor of a computing device to:

fetch, from a first network device, configuration data associated with a service executing on the first network device;

in response to determining that the service extends across multiple network devices, construct, based on the configuration data, a first partial service instance associated with the service executing on the first network device;

merge a plurality of partial service instances to form a merged partial service instance, the plurality of partial service instances including the first partial service instance and a second partial service instance associated with the service executing on a different network device; and promote the merged partial service instance as a service instance.

* * * * *